United States Patent
Sullivan et al.

(10) Patent No.: US 11,765,290 B2
(45) Date of Patent: Sep. 19, 2023

(54) DOCUMENT IMAGING SYSTEM AND METHOD FOR IMAGING DOCUMENT

(71) Applicant: Opex Corporation, Moorestown, NJ (US)

(72) Inventors: Michael Sullivan, Feasterville, PA (US); John Allen, Lindenwold, NJ (US); David Helmlinger, Mount Laurel, NJ (US); Robert DeWitt, Marlton, NJ (US); Michael York, Cinnaminson, NJ (US); Robert Esche, Moorestown, NJ (US); Kerry D. O'Mara, Lambertville, NJ (US); Gary Miller, Medford, NJ (US)

(73) Assignee: OPEX Corporation, Moorestown, NJ (US)

( * ) Notice: Subject to any disclaimer, the term of this patent is extended or adjusted under 35 U.S.C. 154(b) by 151 days.

(21) Appl. No.: 17/080,258

(22) Filed: Oct. 26, 2020

(65) Prior Publication Data
US 2021/0044711 A1 Feb. 11, 2021
US 2022/0217244 A9 Jul. 7, 2022

Related U.S. Application Data

(63) Continuation of application No. 16/174,975, filed on Oct. 30, 2018, now Pat. No. 10,855,864, which is a continuation of application No. 14/704,280, filed on May 5, 2015, now abandoned, which is a continuation of application No. PCT/US2015/029119, filed on May 4, 2015.

(60) Provisional application No. 61/988,880, filed on May 5, 2014, provisional application No. 61/988,148, filed on May 2, 2014.

(51) Int. Cl.
*H04N 1/04* (2006.01)
*H04N 1/00* (2006.01)
*H04N 1/12* (2006.01)

(52) U.S. Cl.
CPC ..... *H04N 1/00588* (2013.01); *H04N 1/00602* (2013.01); *H04N 1/122* (2013.01)

(58) Field of Classification Search
CPC . H04N 1/00588; H04N 1/00602; H04N 1/122
USPC .......................... 358/498, 496; 399/364, 367
See application file for complete search history.

(56) References Cited

U.S. PATENT DOCUMENTS

| | | |
|---|---|---|
| 2,613,789 A | 10/1952 | McLaughlin |
| 2,877,048 A | 3/1959 | Burt |
| 3,057,655 A | 10/1962 | Burt |
| 3,079,167 A | 2/1963 | Russell |
| 3,088,770 A | 5/1963 | Ferneau |
| 3,669,031 A | 6/1972 | Cole |
| 3,759,565 A | 9/1973 | Ferneau |

(Continued)

*Primary Examiner* — Cheukfan Lee
(74) *Attorney, Agent, or Firm* — Stephen Eland

(57) ABSTRACT

A system is provided for processing documents. In particular, the system is incorporates a feeder for feeding documents to a device for further processing of the documents. For instance, the system finds particular application in the field of document imaging in which a variety of documents of varying sizes and orientation are to be fed to an imaging system, such as a document scanner. The system may provide an input mechanism for easily identifying a characteristic of one of the documents and the system may include features for handling packets of documents.

14 Claims, 21 Drawing Sheets

(56) References Cited

U.S. PATENT DOCUMENTS

| | | |
|---|---|---|
| 3,980,334 A | 9/1976 | Ferneau |
| 4,052,097 A | 10/1977 | Weil |
| 4,192,541 A | 3/1980 | Ferneau |
| 4,458,890 A * | 7/1984 | Kawazu .................. B65H 3/54 271/37 |
| 4,921,295 A | 5/1990 | Stollenwerk |
| 5,015,024 A | 5/1991 | Bloemer |
| 5,084,922 A | 2/1992 | Louit |
| 5,115,918 A | 5/1992 | DeWitt |
| 5,273,516 A | 12/1993 | Crowley |
| 5,464,099 A | 11/1995 | Stevens |
| 5,509,159 A | 4/1996 | Du-Bois |
| 5,537,700 A | 7/1996 | Way |
| 5,819,671 A | 10/1998 | Ocampo |
| 5,863,052 A | 1/1999 | Roman |
| 6,070,899 A | 6/2000 | Gines |
| 6,135,441 A | 10/2000 | Belec |
| 6,203,085 B1 | 3/2001 | Ferris |
| 6,550,764 B2 | 4/2003 | Wilson et al. |
| 6,575,491 B2 | 6/2003 | Miller |
| 6,976,696 B2 | 12/2005 | O'Krangley |
| 7,131,151 B2 | 11/2006 | Ferneau |
| 7,140,055 B2 | 11/2006 | Bishop |
| 7,308,858 B2 | 12/2007 | Lo |
| 7,389,552 B1 | 6/2008 | Reed |
| D574,881 S | 8/2008 | Forbes |
| 7,424,758 B2 | 9/2008 | Broadley |
| 7,478,855 B2 | 1/2009 | Lambarth |
| 7,988,120 B2 | 8/2011 | Hsu |
| 8,051,513 B2 | 11/2011 | Reed |
| 8,439,416 B2 | 5/2013 | Lambarth |
| 8,459,632 B2 | 6/2013 | DeWitt et al. |
| 8,640,283 B2 | 2/2014 | Broadley |
| 8,714,612 B2 | 5/2014 | Chinn |
| 8,939,274 B1 | 1/2015 | Ross, Jr. |
| 9,107,781 B1 | 8/2015 | Edgerton |
| 9,381,128 B2 | 7/2016 | Rozewicz |
| 9,731,740 B1 | 8/2017 | Chafin |
| 9,849,582 B2 | 12/2017 | Cheff |
| 2002/0074708 A1 * | 6/2002 | Nagata ............... G03G 15/6541 270/58.08 |
| 2002/0105169 A1 | 8/2002 | Dahl |
| 2004/0070798 A1 | 4/2004 | Andersen et al. |
| 2004/0111798 A1 | 6/2004 | Matunaga |
| 2005/0018214 A1 | 1/2005 | DeWitt |
| 2005/0229312 A1 | 10/2005 | Bishop |
| 2006/0006628 A1 | 1/2006 | Fields |
| 2007/0003009 A1 | 1/2007 | Gray |
| 2007/0169977 A1 | 7/2007 | Ellis |
| 2009/0000034 A1 | 1/2009 | Myers |
| 2010/0006649 A1 | 1/2010 | Bolton |
| 2011/0254219 A1 * | 10/2011 | Helmlinger ............ B65H 5/068 271/258.01 |
| 2011/0266821 A1 | 11/2011 | Goto |
| 2011/0277426 A1 | 11/2011 | Allen et al. |
| 2012/0113488 A1 | 5/2012 | Machida et al. |
| 2012/0199753 A1 | 8/2012 | Chuang |
| 2012/0275896 A1 | 11/2012 | Magill |
| 2015/0144536 A1 | 5/2015 | Dugat |
| 2015/0216747 A1 | 8/2015 | Valentino |

* cited by examiner

DOCUMENT IMAGING SYSTEM AND METHOD FOR IMAGING DOCUMENT

PRIORITY CLAIM

The present application is a continuation of co-pending U.S. patent application Ser. No. 16/174,975 filed on Oct. 30, 2018, which is a continuation of U.S. patent application Ser. No. 14/704,280 filed May 5, 2015, which is a continuation of International Patent Application No. PCT/US15/29119 filed on May 4, 2015, which claims priority to U.S. Provisional Appl. No. 61/988,148 filed on May 2, 2014 and U.S. Provisional Appl. No. 61/988,880 filed on May 5, 2014. The entire disclosure of each of the foregoing applications is hereby incorporated herein by reference.

FIELD OF THE INVENTION

The present invention relates to the field of document processing. In particular the present application relates to feeding documents to a device for further processing of the documents. The present invention finds particular application to the field of document imaging in which documents are to be fed to an imaging system, such as a document scanner.

BACKGROUND

Automated and semi-automated machines have been employed for processing documents. Further, in many instances it is desirable to obtain image data of the documents. However, documents may be organized either individually, in packets or in large stacks. If the documents are in packets or stacks, the individual documents need to be separated to be scanned. Although advances have been made in the processing of such packets, it is desirable to have an improved system for feeding packets and larger stacks with minimal manual preparation.

SUMMARY OF THE INVENTION

In light of the foregoing, an apparatus is provided for improving the semi-automated processing of packets of documents. The apparatus includes a feeder operable to receive a packet of a plurality of documents and separate the documents to serially feed the documents away from the feeder.

In light of the foregoing, the present invention addresses various shortcomings of the prior art. For instance, according one aspect, the present invention provides an apparatus for scanning packets of documents. The apparatus may include a feeder operable to receive a packet of documents wherein the feeder comprises an entry gap. A sensor detects a characteristic of the documents in a packet indicative of whether the number of documents in a packet exceeds a predetermined threshold. A drive mechanism controls the distance that the packet is advanced into the feeder in response to the detected characteristic of the packet. The apparatus may comprise a scanner for scanning the documents to obtain image data for the documents and it may comprise a generally horizontal conveyor for conveying packets of documents to the drive mechanism.

According to another aspect, an apparatus for processing documents is provided that includes a feeder a pre-singulator and a sensor. The feeder may be operable to receive a packet of a plurality of documents and separate the documents to serially feed the documents away from the feeder. The pre-singulator may be disposed adjacent the feeder. The pre-singulator may comprise a first roller and a second roller forming a first nip for receiving a packet of documents. The first roller may be displaceable away from the second roller to form a gap having a height between the first and second rollers. The sensor may be operable to detect a characteristic of the transaction indicative of whether the number of documents in the transaction exceeds a predetermined threshold. A controller may be provided which independent controls the operation of the two pre-feeders. Optionally, the controller controls the position of the first roller to control the height of the first gap.

According to another aspect, an apparatus for processing documents having a controller a sensor array and either a sorter or a scanner is provided. The controller may control the processing of the documents being processed by the sorter or scanner. The sensor array may comprise a plurality of sensors. Optionally, the sensors may be spaced apart from one another and the sensors may be positioned to allow an operator to displace a document over one or more sensors of the array. The controller may receive signals from the sensor array indicative of which sensor or sensors the document was passed over and the order in which the document passed over the sensor(s). The sensor array may be configured so that passing a document over the sensors from a first direction identifies the document as a first type of document and passing the document over the sensors from a second direction identifies the document as a second type of document. The controller may electronically tag the document based on the document type identified using the sensor array.

According to another aspect, the present invention provides a method for processing documents. The method may include the step of passing a first document over a sensor array having a plurality of sensors, wherein the step of passing the first document over the sensor array comprises displacing the document in a first direction. The method may include the step of electronically tagging the first document as being a first document type based on the step of passing the first document in the first direction over the sensor array. The method may also include the step of passing a second document over the sensor array by displacing the document in a second direction and the method may also include the step of electronically tagging the second document as being a second document type based on the step of passing the second document in the second direction over the sensor array. The method may also include the step of controlling the processing of either a scanner or a sorter to process the first document type differently from the second document type.

According to a further aspect, the invention provides a method for processing documents, comprising the steps of displacing a document relative to a sensor in a first direction to identify the document as a first document type and the step of displacing the document in a second direction relative to the sensor array to identify the document as a second document type. The method may also include the step of controlling the first processing of the document based on whether the document is identified as a first document type or a second document type. For instance, the document may be electronically tagged as the first document type. Alternatively, the document may be sorted to a first area if the document is identified as a first document type or the document may be sorted to a second area if the document is identified as a second document type. Alternatively, the document may be scanned by a scanner in a first manner if the document is identified as a first document type or the document may be scanned in a second manner if the document is identified as a second document type.

According to a further aspect, the present invention provides an apparatus for scanning documents, comprising a generally horizontal conveyor, a scanner for scanning the documents dropped onto the conveyor a first support and a second support. In a first orientation the first and second supports are spaced apart from one another with the conveyor between the first support and the second support so that the conveyor is spaced off the ground. In a second orientation the first and second supports pivot to collapse the apparatus for transportation.

According to another aspect, the present invention provides a method for scanning documents. The method may include the step of providing a scanner workstation that may have a generally horizontal conveyor, a scanner for scanning the documents, a first support that is displaceable, and a second support that is displaceable. The method may include the step of displacing the first and second supports into a first orientation in which the first and second supports are spaced apart from one another with the conveyor between the first support and the second support so that the conveyor is spaced off the ground and provides an open area between the conveyor and the ground. The method may also include the step of inserting a portion of the scanning workstation onto a vehicle and then displacing the first and second supports into a second orientation to collapse the apparatus for transportation while the portion of the scanning workstation supports the scanning workstation.

DESCRIPTION OF THE DRAWINGS

The foregoing summary and the following detailed description of the preferred embodiments of the present invention will be best understood when read in conjunction with the appended drawings, in which.

DETAILED DESCRIPTION OF THE INVENTION

Figure 1:
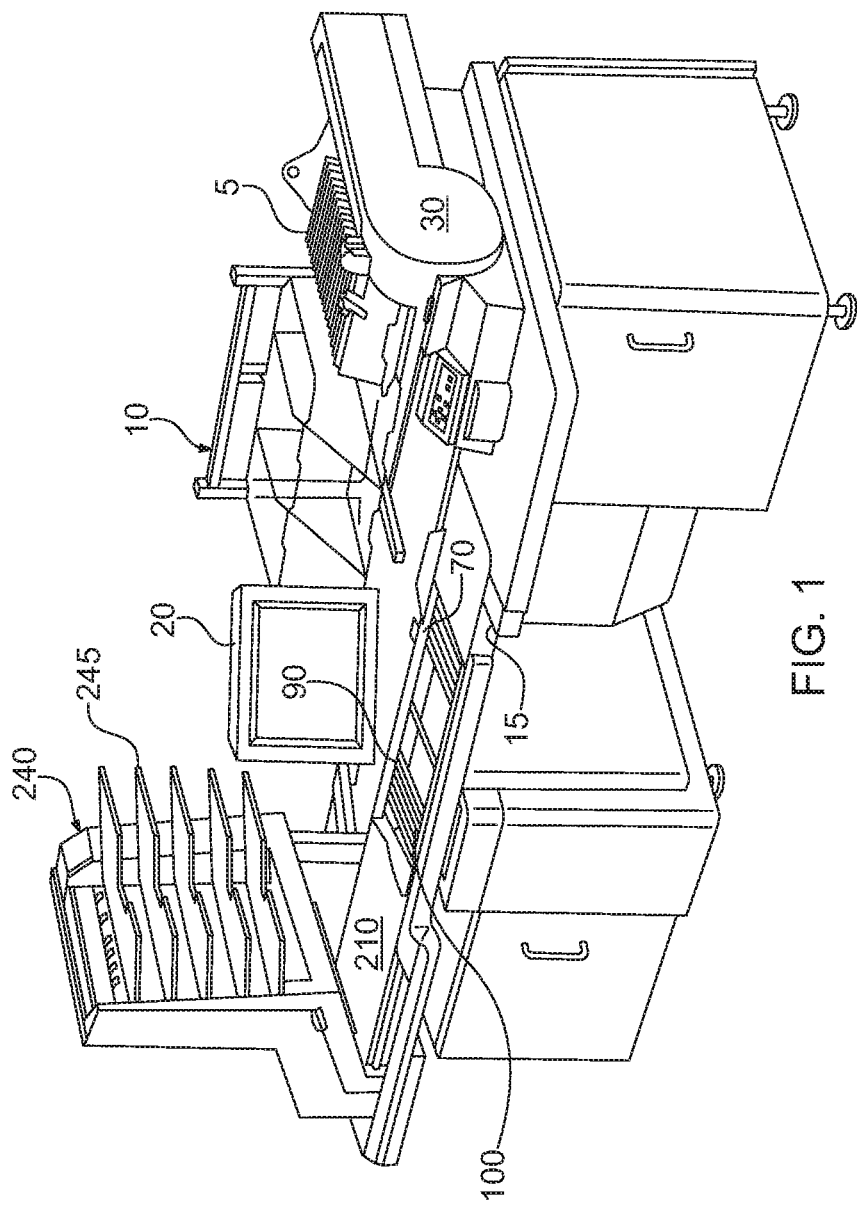
FIG. 1 is a perspective view of a document processing system.

Referring now to the figures in general and to FIG. 1 in particular, a document scanning workstation 10 is illustrated. The workstation 10 processes documents by dropping the documents individually or in stacks onto a conveyor that conveys the documents to an imaging station. The imaging station separates the documents, serially feeding the documents to an imager that obtains image data for the documents. The documents are then sorted into one or more output bins.

The present system is directed to improving the flow of documents in a document processing system. The system has particular application to workstations directed to processing documents, and has particular application to processing packets of documents to scan the documents to obtain image data. In an exemplary embodiment, the workstation is configured as a semi-automated system for processing documents of a variety of types, including documents of varying size as well as folded documents, such as documents extracted from envelopes. The system may be incorporated into a larger system that includes elements such as a cutting station for cutting open envelopes and an extraction station for opening the envelopes to present the documents to the user for extraction. Such stations are described in detail in U.S. patent application Ser. No. 13/090,172, the entire disclosure of which is hereby incorporated herein by reference. However, it should be understood that the present system has application to systems that do not incorporate document extraction features, but are instead directed to processing documents generally. For instance, features of the present system may be incorporated into a system that does not include the extraction features, but includes the horizontal conveyor, scanning station and sorting station. Further still, features of the system may have application generally in a document processing system in which it is desirable to manually feed packets of documents into the system without organizing or otherwise preparing the packets for feeding into the system.

Brief Overview of Document Extraction Embodiment

With the foregoing in mind, a general overview of the flow of documents in an exemplary system for processing mail is as follows. Initially, a stack of envelopes containing documents, referred to as a job, is placed into an input bin. A feeder 30 removes the lead envelope 5 from the front of the stack and transfers the envelope to a feed tray.

The envelope 5 in the feed tray is edge-justified by a plurality of opposing rollers. From the feed tray, the envelope 5 drops into a side cutter, which severs the side edge of the envelope if desired. From the side cutter, the envelope drops into a shuttle. The shuttle moves vertically to adjust the height of the top edge of the envelope to account for variations in the height of the different envelopes in the job. The shuttle moves vertically until the height of the top edge of the envelope 5 is within an acceptable range for advancing the envelope into a top cutter. The envelope is then transported to the top cutter, which severs the top edge of the envelope 5.

From the top cutter the envelope is advanced to an extraction station 70. The extraction station 70 pulls apart the front and back faces of the envelope to present the contents of the envelope for removal. An operator then manually removes the contents from the envelope 5.

After the operator removes the documents from the envelope 5, the apparatus 10 automatically advances the envelope to a verifier 90. The verifier 90 verifies that all of the documents were removed from the envelope before the envelope is discarded. From the verifier 90 the envelope is conveyed into a waste container. Alternatively, the envelope 5 may be manually removed and imaged at the imaging station 210.

After the documents are extracted at the extraction station, the operator unfolds as needed and drops or places the extracted documents onto a drop conveyor 100 that transports the documents toward an imaging station 210. An imaging entry feeder 110 receives the documents from the drop conveyor 100 and controls the feeding of the documents into the imaging station 210. The image entry feeder 110 is configured to receive and feed documents of various sizes and condition. For instance, frequently documents are folded in an envelope. When the documents are extracted and opened up, the documents are creased or folded so that they do not lie flat. The feeder 110 is preferably configured to receive such creased or folded documents and serially feed the folded documents into the imaging station 210 with minimal manual preparation by the operator.

The imaging station 210 includes an imager 230 that obtains image data for each document as the document is conveyed past the device. For instance, preferably the imager 230 is a scanner that obtains gray scale or color image data representing an image of each document. The scanner scans each document at a plurality of points as the document is conveyed past the scanner. The information for each document is stored in a data file for each document so that the image data can be accessed at a later time.

From the imaging device, preferably an imaging transport conveys the documents to a sorting station 240 that sorts the documents into a plurality of output bins 245. The documents can be sorted in a variety of ways. For instance, the documents can be sorted based on document information obtained from the image data received at the imaging station 210. Alternatively, the operator may indicate information regarding a document before it is scanned, so that the document is sorted according to the information indicated by the operator. Yet another alternative is that the documents may be stacked into one or more bins simply based on the order in which the documents are processed.

Since many of the documents may be creased, ordinarily the documents will not readily stack in a compact manner so that relatively fewer creased documents can be discharged into a bin before the bin is full. Accordingly, the documents may be processed by an uncreaser, which is an element that reduces the creasing or folds in the documents. The uncreaser flattens or straightens the documents so that they lay more flatly in the output bins so that more documents can be discharged into a bin before the bin is full.

A controller controls the processing of the mail in response to signals received from various sensors at various locations of the workstation 10 and in response to parameters set for the job by the operator. For instance, in response to an indication from a sensor in the feed tray that there is no envelope in the feed tray, the controller sends a signal to the feeder envelope 30 indicating that an envelope should be fed from the input bin to the feed tray. Similarly, in response to an indication from a sensor in the shuttle that there is no envelope in the shuttle, the controller sends a signal to the feed tray indicating that an envelope should be dropped from the feed tray into the shuttle.

The workstation is divided into numerous functionally separate sections, which include: a feeding station 30, a side cutting station, a top cutting station, the extraction station 70, the verification station 90, the imaging station 210, and the sorting station 240. In most cases, the controller controls the operation of the various sections independently from each other. This independence allows several operations to proceed simultaneously or asynchronously as required. As a result, a slow down in one section does not necessarily slow down all of the other sections.

In addition, preferably the operations of the apparatus from the drop conveyor through the sorting station are controlled separately from the operation of the other stations. Further, preferably, an operator interface is provided so that the operator can intervene to control the processing of the documents. Specifically, preferably a touch screen display 20 is provided that allows the operator to enter various information regarding the documents.

Figure 2:
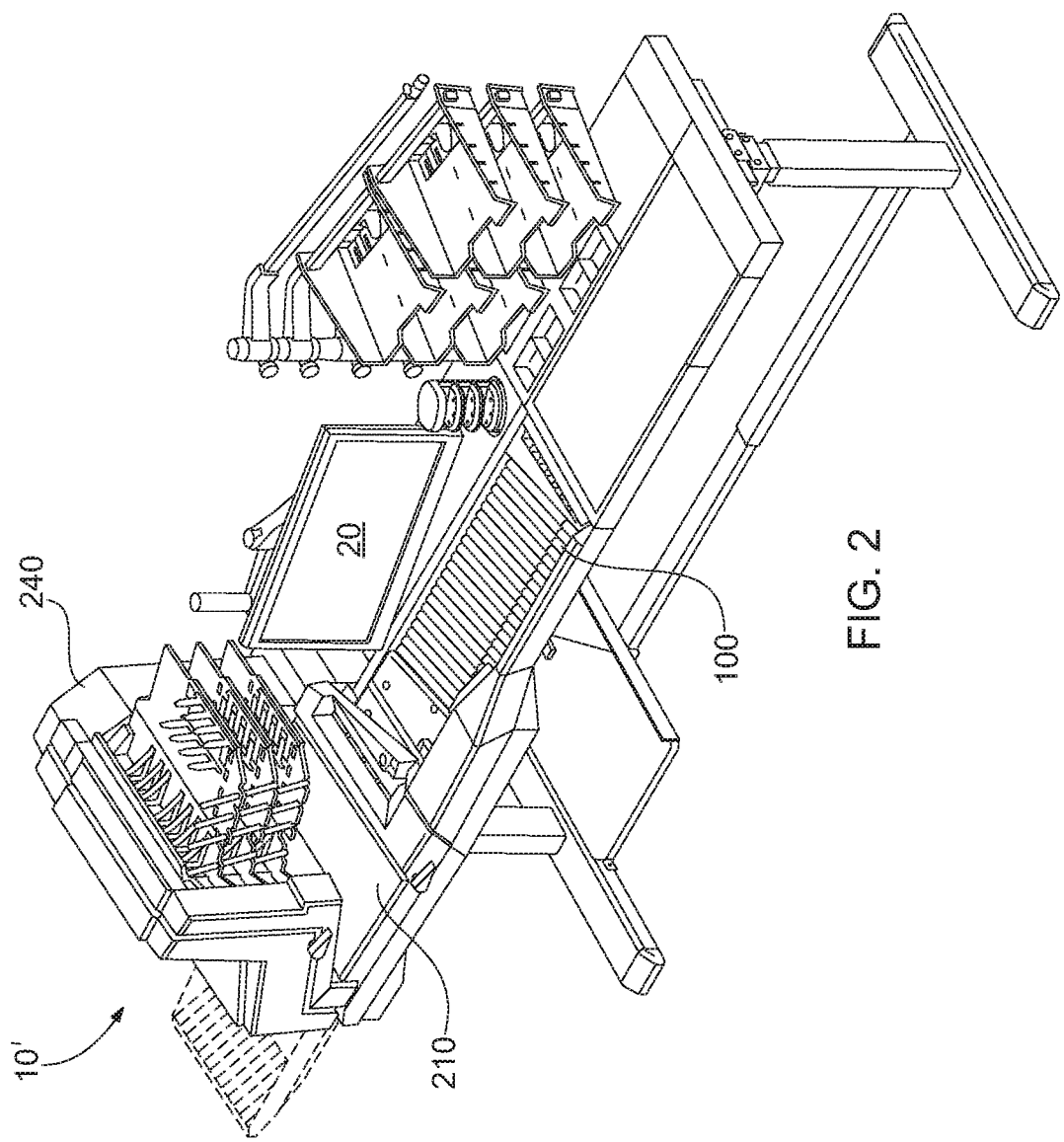
FIG. 2 is a perspective view of an alternate embodiment of a document processing system.

In the foregoing description, the imaging work station 10 is described as including a variety of stations for opening envelopes so that documents can be extracted from the envelopes and then scanned. Alternatively, an alternative embodiment is illustrated in FIG. 2 in which the imaging work station is designated 10'. In this alternative embodiment, the work station includes a substantially similar drop conveyor 100, imaging station 210 and sorting station 240. However, the alternative work station 10' does not include the envelope feeding, cutting and opening stations as illustrated in FIG. 1. Therefore, it should be understood that the following description of the drop conveyor, image entry station, imaging station and sorting station are applicable for both the first and second embodiments illustrated in FIGS. 1-2.

Details of the Drop Conveyor

Referring to FIGS. 1-2, the drop conveyor 100 is configured to receive a variety of documents, including, but not limited to documents extracted from the envelopes. The conveyor 100 is disposed along the front edge of the work station 10, such that the conveyor is operable to convey documents adjacent to and parallel to the front edge of the work station. In addition, the conveyor preferably conveys the dropped documents toward the left hand side of the workstation from the perspective of FIGS. 1-2.

The conveyor is configured to receive documents that are dropped onto the conveyor in a generally horizontal or substantially horizontal orientation and then convey the dropped documents to the imaging station 210. In this way, the operator can readily extract and, if necessary, unfold documents and simply drop a document or packet of documents onto the conveyor with minimal preprocessing of the documents to prepare the documents for scanning.

Although the operator preferably drops the documents onto the drop zone of the conveyor, the drop zone is a substantial area that is much larger than the documents. Accordingly, the operator does not need to be precise with the location and orientation that the documents are dropped onto on the conveyor. However, preferably the operator drops the documents so that the documents are front face up on the conveyor.

Figure 9:
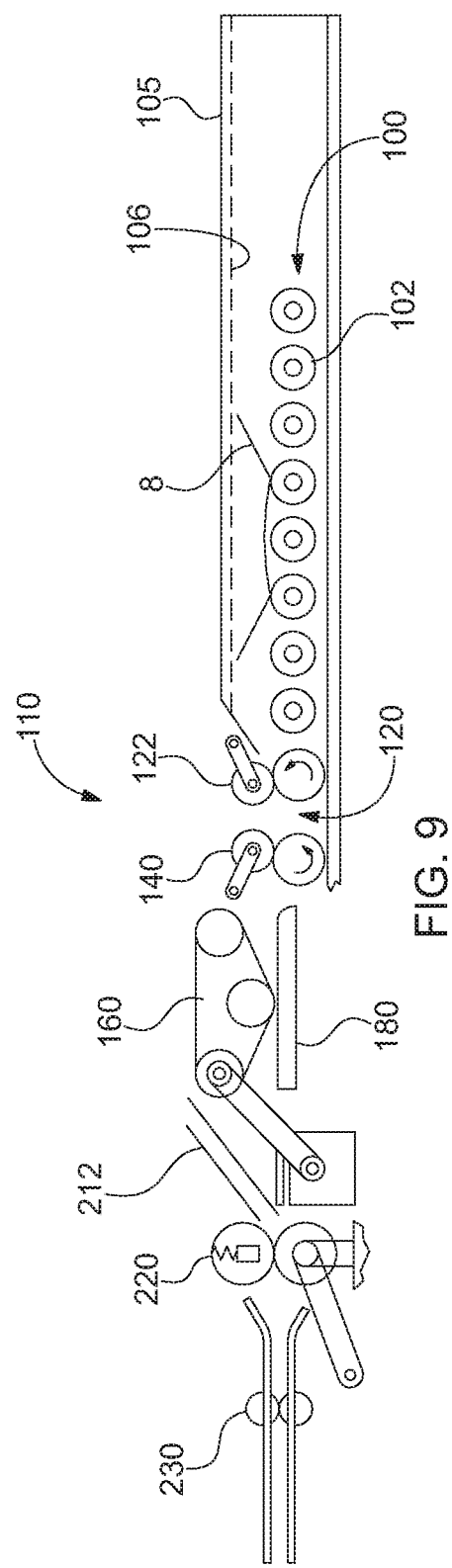
FIG. 9 is a schematic view of the document path of the device illustrated in FIG. 2.

To this end, referring to FIGS. 1, 2 and 9, preferably the conveyor 100 is a roller bed conveyor. The bed of rollers provides a generally horizontal surface onto which documents can be dropped. The roller bed comprises a plurality of horizontally disposed cylindrical rollers driven by a belt engaging the bottom of the rollers, which in turn is driven by a motor controlled by the system controller. The rollers 102 may be parallel to each other and perpendicular to the direction of travel so that the documents move straight along the roller bed 100. However, preferably, the rollers are skewed so that the rollers drive the documents forwardly along the roller bed and laterally toward a justification rail 105. In this way, the skewed rollers 102 drive the documents against the rail 105 to edge-align or justify an edge of the documents against the rail.

Each of the rollers 102 comprises a plurality of grooves sized to receive O-rings. The O-rings have a higher coefficient of friction than the surface of the rollers, to provide an area of increased friction between the roller bed and the documents, thereby improving the justification of the documents. As mentioned previously, the document rests on the rollers. Therefore, as the rollers 102 rotate, the rollers move the documents forwardly.

Although, the drop conveyor 100 has been described as a roller bed conveyor, alternative types of conveyors can be utilized as the drop conveyor. For instance, the drop conveyor may comprise a horizontal conveyor belt. If a conveyor belt is used, preferably the belt is skewed toward the rail 105 so that the belt justifies the documents against the rail. Alternatively, rather than a single conveyor belt, the drop conveyor may comprises a plurality of smaller conveyor belts onto which the documents may be dropped.

Although the conveyor 100 is referred to as a horizontal conveyor, preferably the drop conveyor is angled downwardly so that gravity urges the documents toward the guide rail 105. Preferably the conveyor 100 is angled at approximately five degrees, however, the angle may be higher, and in fact, the angle of the conveyor may be increased to a point that the conveyor is vertical rather than horizontal. In addition, preferably the imaging station and sorting station are angled downwardly similarly to the drop conveyor.

Document-Type Identification

As an operator processes documents, the operator may notice characteristics of various documents that would affect the processing of the document or transaction. Since the system is configured to process a wide variety of documents, there may be numerous characteristics that could affect how a document is processed. Therefore, the system provides an interface that allows the operator to input information about numerous characteristics of a document.

The system includes an interface, such as a touch screen 20, which the operator may use to identify the document-type prior to dropping the document onto the conveyor 100 for processing. Additionally, the system may include a gesture-based document identification assembly 50 for readily identifying the document-type prior to dropping the document. The document ID assembly 50 is configured to identify several different document-types by simply inserting the document into the document ID assembly in a particular manner so that the operator can quickly and easily identify the document-type.

The document ID assembly 50 is a small tower that includes a plurality of sensor arrays 60a, 60b, 60c. Each sensor array is separately operable to identify a particular characteristic of the document to signal how the document is to be processed. For instance, each sensor array is operable to identify the document-type, which then may be used to determine how the scanned image data for the document is to be processed. The number of sensor arrays and the orientation of the sensor arrays may vary, however, in the present instance, the document ID assembly 50 includes three generally horizontal slots 52, 54, 56. More specifically, the three slots are spaced apart from one another and are oriented in a vertical column so that the upper slot 52 is above the middle slot 54, which is above the lower slot 56. The document ID assembly housing is configured to provide access from the right and left sides of the document ID assembly and from the front of the assembly. Accordingly, the slots are configured so that the operator can easily insert a document into any of the three slots 52, 54, 56 to identify the document-type.

Figure 3:
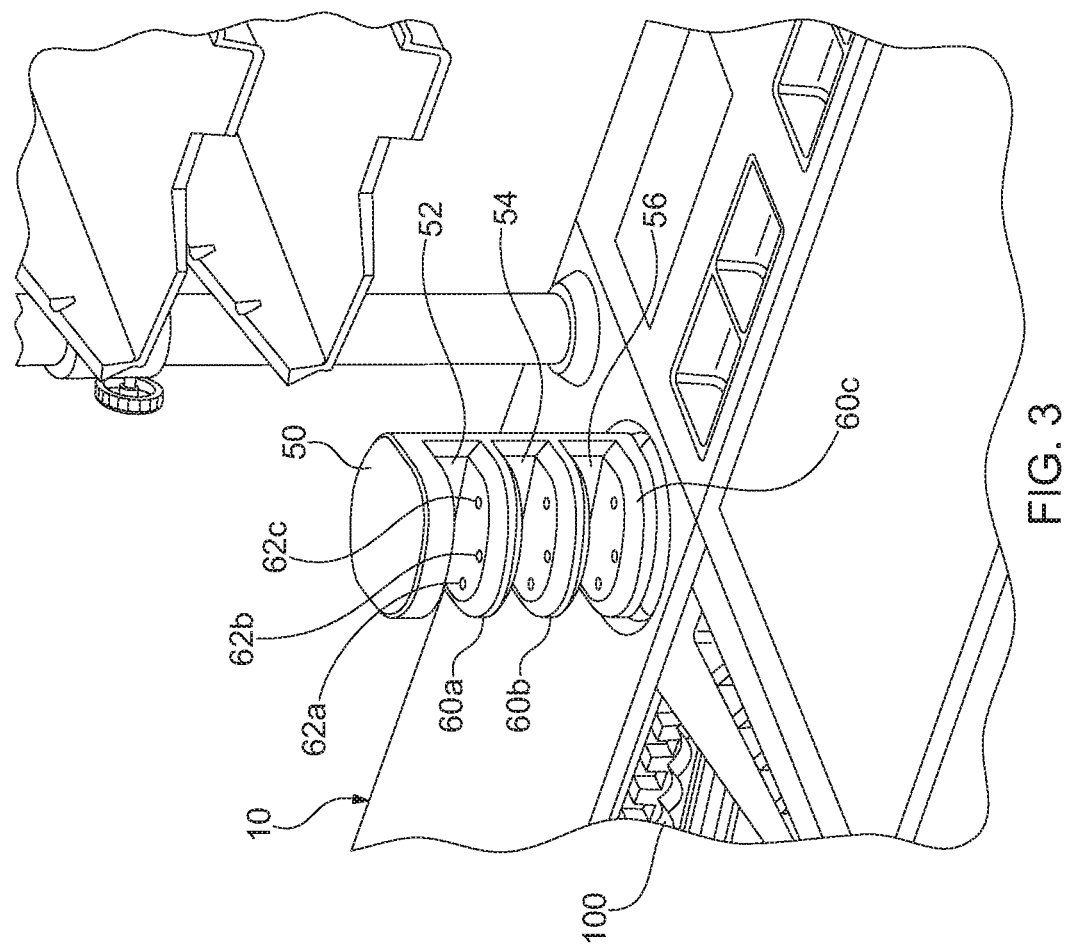
FIG. 3 is a perspective view of a document identification assembly for the system of FIG. 2.

A sensor array 60a, 60b or 50c is disposed within each of the three slots. The sensor arrays may be configured in a variety of orientations. In the present instance, each sensor array includes three separate document sensors. For instance, referring to FIG. 3, sensor array 60a is disposed within upper slot and sensor array 60a includes three sensors spaced apart from one another. For example, the sensors may be positioned so that all three sensors are in a line from the right side of the upper slot toward the left side of the upper slot or from the front opening of the slot toward the rear wall of the upper slot. However, in the present instance, the sensors are oriented so that the three sensors 62a, 62b, 62c form an offset configuration. In particular, the first sensor 62a is positioned adjacent the left edge about halfway toward the rear wall of the upper slot 52. The second sensor 62b is located adjacent the front edge of the upper slot 52 about halfway across the width of the upper slot. The third sensor 62c is located adjacent the right edge of the upper slot about halfway toward the rear wall. Positioned in this way, the three sensors form a triangular pattern.

The sensors may be any of a variety of sensors for detecting the presence of a document in the respective slot of the document ID assembly. However, in the present instance, each sensor comprises an emitter positioned in the lower wall of the respective slot and a receiver positioned in the upper wall of the slot. The sensor operate as beam break sensors so that when a documents is placed between the emitter and the receiver, the document blocks the signal from the emitter so that the receiver does not receive the signal from the emitter. In this way, when the document blocks the sensor, a controller, such as a microprocessor receives a signal from the sensor and interprets the signal to indicate that a document has been inserted into the respective slot. One exemplary type of sensor to be used in the sensor arrays is an infra red emitter and receiver pair. However, it should be understood that a variety of alternate document detectors can be used to detect the presence of a document.

Although each slot of the document identification assembly can be configured differently, in the present instance, the layout of the sensors in each of the arrays is substantially similar. Specifically, in each array 60a, 60b, 60c, the sensors 62a, 62bb 62c are spaced apart from one another in an offset pattern to form a triangular configuration.

By using multiple sensors in each array, the same array can be used to automatically identify several different document types. For example, if the operator inserts the document into the upper slot by inserting the document into the upper slot 52 from right to left—in essence swiping the document through the slot—the right sensor 62c will first detect the document, then the middle sensor 62b will detect the document, then the left sensor will detect the document. The system controller receives the signals from the sensor array and identifies the document as a first document-type when the signals from the sensors are: right, middle, left. The system controller then controls the processing of the document image and/or sorts the document accordingly. Conversely, if the document is swiped through the upper slot from left to right, the order of signals from the sensors will be reversed (i.e. left 62a, middle 62b then right 62c). When the system controller receives such a sequence of signals, the system controller identifies the document as a second document-type and processes the document images and/or sorts the document accordingly. Further still, since the middle sensor 62b is offset from the left and right sensor 62a, 62c, the sensor array can be used to identify a third document-type in response to inserting the document straight into the upper slot 52 rather than swiping the document through the slot from right to left or from left to right. When the document is inserted straight (or generally straight) into the upper slot 52, the middle sensor 62b will first detect the presence of the document. As the document is inserted further, the left and/or right sensor(s) will then detect the presence of the document, depending on whether the document is skewed. When the system controller receives a sequence of signals in which the middle sensor first detects the document and then receives a signal from one or both of the right and left sensors, the system identifies the document or documents as being a third document-type and processes the images and/or sorts the document(s) accordingly.

As mentioned above, the document identification assembly 50 includes three insertion slots 52, 54, 56, each having an array of multiple sensors. In the present instance, each sensor array 60a. 60b, 60c is operable to identify three different document types based on the manner in which the document is inserted into the insertion slot. Configured as such, the system is capable of identifying nine unique document types. Since each different document-type can be identified by swiping the document over a sensor array in the identification assembly, the system allows rapid identification of numerous document-types so that the operator does not need to waste time inputting information into the system to identify the document type for documents that require special or separate processing.

Although the document identification system has been described as having three input slots each having an array of three sensors, it should be understood that the number of sensor arrays and the number of sensors in each array may be varied depending on the application. For instance, identifying three document-types may be sufficient for many applications. In such an instance, the document identification assembly 50 may only include a single array of three sensors. Similarly, rather than including three sensors, each array may include just two sensors so that each array is only capable of detecting swiping in two directions rather than three. Accordingly, it should be understood that the document identification assembly can be varied to provide different configurations of arrays that use different motions for distinguishing between document-types. Further still, the document-type identification can be determined based on only one or more of the sensors in an array. For instance, the operator may insert a document into one of the slots so that only the left sensors is blocked and then the document is pulled back out without covering any of the other sensors. As long as no other document is inserted into the same sensor array within a pre-determined time frame, the system will determine the document-type based on the signal from the one sensor. In this way, the number of gestures can be increased to increase the number of different document types that can be identified by a gesture.

For instance, returning again to the embodiment in which the document identification assembly 50 includes three array of three sensors, in the above-description, each array is able to identify three document types based on the gesture used (e.g. left to right swipe, right to left swipe or in and out swipe). By combining multi-sensor gestures with gestures that swipe fewer sensors, the number of gestures could be more than doubled: a) left to right in-and-out swipe in which only the left sensor is swiped, b) right to left in-and-out swipe in which only the right sensor is swiped, c) in-and-out swipe of the front sensor; d) right to left swipe in which the right and center sensor are swiped but not the left sensor; (e) left to right swipe in which the left and center sensors are swiped but not the right sensor; (f) skewed right in-and-out swipe in which the center sensor and then the right sensor is swiped but not the left sensor; and skewed left in-and-out swipe in which the center and then the left sensor are swiped but not the right sensor.

Utilizing this method, the system can be used to identify a variety of document characteristics, and process the documents accordingly. Although a primary purpose for identifying the document-type is to control processing of the scanned image(s) of the identified document or packet of documents, it may be desirable to identify certain documents and sort those documents to a particular bin. Accordingly, the document-type determination can be used to control any of a variety of subsequent processing steps for the identified document(s). However, identifying the document-type is typically done to identify a characteristic of the document to process the scanned image in a particular manner. For example, a characteristic may be to identify whether the document is printed in a landscape orientation. If a standard 8½×11 sheet of paper is identified as being in a landscape orientation, the system can auto-rotate the image appropriately so it can be displayed in a landscape orientation rather than in a portrait orientation.

Accordingly, the system can be used to identify numerous features, such as the following:

Color—The operator can identify documents that should be scanned in color. In some jobs, the default scan may be black and white or gray scale. If the operator identifies a document for color scanning, the document is scanned in color rather than black and white or gray scale.

Color dropout—The operator can identify documents that should be scanned in color, but with a particular color dropped out from the scan. As part of the set-up for a job, the operator selects the color that should be dropped from the scan.

Transaction boundary—The operator can identify a document as a transaction boundary. For instance, an operator can identify a document as being the last document in a transaction. Subsequent documents will be identified in a separate transaction.

Automatic rotation—The operator can identify documents that need to be rotated, such as documents that are in landscape orientation.

Page-type determination—The operator can identify the document type, particularly if two different types of documents have similar physical attributes. For instance, a job may have two document types that are virtually identical in size, such as a check and a money order. The page-type determination can be used to distinguish a money order from a check, so that the document images can be scanned appropriately and the documents can be sorted separately, if desired.

This list of document features illustrates some of the different characteristics that can be identified by the operator. In addition, numerous other characteristics can be identified for different type of documents and different applications. Accordingly, the above list is not an exhaustive list of all of the features that can be used to tag documents for different processing.

Image Entry Feeder

Referring to FIGS. 4-7, the details of the image entry feeder 110 will be described in greater detail. The image entry feeder is positioned adjacent the end of the drop conveyor 100, so that the drop feeder conveys the documents to the image entry feeder, which in turn feeds the documents to the imaging station 210. As the documents are conveyed to the image entry feeder 110, the documents are generally horizontally disposed, riding on top of the drop conveyor 100 and are edge-aligned against the justification rail 105.

The image entry feeder 110 is operable to serially feed documents from the drop conveyor 100 to the imaging station 210 so that the documents can be individually imaged. The image entry feeder 110 is operable to receive a number of different types of documents, including individual documents, envelopes, and packets of envelopes. In the following discussion, a packet of documents should be understood to mean a group of two or more documents that are in overlapping relation, as opposed to a number of documents that may be related, but which are conveyed serially to the image entry feeder. A packet may be as few as two documents, but may be substantially more. Specifically, as discussed further below, the system may be configured to process large packets of 50, 100 or even 200 documents. When a group of documents becomes large it is commonly referred to as a stack. However, for ease of discussion, it should be understood that a packet includes any group of two or more documents, including large packets commonly referred to as a stack.

When processing packets, the image entry feeder 110 separates and serially feeds each document in a packet to the imaging station 210. The image entry feeder 110 includes a pre-feeder assembly 120 and a feeder 160. The pre-feeder assembly 120 is configured to prepare packets for entry into the feeder 160, thereby reducing the likelihood of a jam occurring as a packet enters or is processed by the feeder.

The pre-feeder assembly 120 comprises a first pre-feeder 122 and a second pre-feeder 140 that control the packet of documents travelling from the drop conveyor 100 to the feeder 160. The first pre-feeder assembly 122 includes a pair of opposing rollers 128 and 138 that form a nip. An angled guide at the end of the justification rail 105 overhangs the conveyor 100 and directs the documents downwardly toward the nip of the first pre-feeder assembly 122. More specifically, for folded documents that were unfolded but remained creased or documents that are otherwise not flat, an upper edge of the documents tends to be spaced off the surface of the drop conveyor. The justification rail 105 has a lip overhanging the drop conveyor 100, so that this upper edge of the documents tends to be displaced under the lip of the justification rail as the conveyor tends to move the documents toward the justification rail. The angled guide interacts with the justification rail 105, so that the upper edge of the folded documents is flattened downwardly toward the conveyor so that the leading edge of the document can enter the nip of the first pre-feeder assembly rather than folding over.

As mentioned above, the first pre-feeder assembly includes an upper roller 128 and a lower roller 138 that form a nip. The upper roller 128 is a drive roller, and the lower roller 138 is a driven roller. The upper roller 128 is mounted on a pivoting arm 130 that pivots about a pivot shaft at a pivot axis 132. A biasing element biases the pivot shaft to urge the upper roller 128 toward the lower roller 138. As documents enter the first pre-feeder assembly 122, the roller and pivoting arm pivot away from the lower roller against the bias of the biasing element to form a gap large enough to accommodate the document or packet of documents entering the first pre-feeder assembly. As the trailing end of the document or packet of documents exits the first pre-feeder assembly 122, the upper roller 128 pivots into engagement with the driven roller 138 until the subsequent document or packet enters the first pre-feeder assembly. Alternatively, if the packet includes numerous documents, an actuator may pivot the upper roller 128 upwardly (counter-clockwise from the perspective of FIG. 5) to reduce the likelihood that the first pre-feeder 122 pushes the top documents off the packet as the packet enters the first pre-feeder. The details of driving the pre-feeders upwardly are discussed further below.

The lower roller 138 of the first pre-feeder 122 is rotatably mounted on a fixed shaft, and may operate simply as an idler roller. In the present instance, the lower roller is coupled to the fixed shaft via a torque limiting device 132. A variety of torque limiting devices can be utilized, and in the present instance, the lower roller is connected with the shaft via a magnetic torque limiter.

From the first pre-feeder assembly 122, the documents enter the second pre-feeder assembly 140. The second pre-feeder also includes a driven upper roller 142 biased toward a driven lower roller 144 to form a nip.

As discussed above, the first and second pre-feeders 122, 140 comprise drive rollers that are biased toward opposing driven rollers. Although the upper drive rollers 128, 142 are pivotable to accommodate thick packets of documents, the upper rollers may tend to push the upper documents in the stack rearwardly (i.e. upstream toward the drop conveyor) as the packet enters the pre-feeders. To maintain the packets in a neat stack, it may be desirable to automatically lift the upper rollers 128, 142 of the pre-feeders prior to the packet entering the first pre-feeder 122.

A variety of actuators may be used to drive the pre-feeder pivot arms upwardly, such as a linear drive element (e.g. a solenoid) or a rotary drive mechanism (a motor with a rotary output shaft). In the present instance, a first motor 125 is operably linked with the pivot arm 130 of the first pre-feeder 122. Specifically, motor 125 is a servo motor that drives an arm 126 clockwise or counter-clockwise (from the perspective of FIG. 4). In the present instance, the connecting linkage is a biasing element, such as a spring. The spring extends from the arm 126 to a rod extending through post 133 that projects away from pivot arm 130 (shown in FIG. 6). In this way, when the controller actuates the servo motor 125 to lift the arm 130 of the first pre-feeder 122, the servo motor rotates arm 126 counter-clockwise, which in turn pulls down post 133, which in turn rotates pivot arm 130 counter-clockwise (from the perspective of FIGS. 4-5) thereby raising the pivots arms. In this way, the upper roller 128 of the first pre-feeder 122 is raised so that the bottom edge of the upper roller is near or above the top surface of the packet of documents. The same actuator may be used to lift both the first and the second pre-feed arms. However, in the present instance, the second pre-feeder 140 is actuated independently by a separate actuator. Specifically, the second pre-feeder includes a second servo motor and linkage configured similarly to the servo motor 125 and linkage described above.

The pre-feeder assembly 120 may be controlled so that the pre-feeder arms are pivoted upwardly before each document or packet of documents enters the pre-feeder assembly. However, lifting the pre-feed roller 128 and 142 is primarily beneficial when the packet is a thick packet of a significant number of documents. Accordingly, a thickness detector positioned along the drop conveyor 100 detects the thickness of documents as they are conveyed along the drop conveyor 100. If a packet of documents exceeds a threshold, the pre-feeder arms are lifted before the packet enters the pre-feeder assembly.

A variety of sensors can be used to measure the thickness of packets on the conveyor 100. In the present instance, one or more reflective sensors are mounted on the justification rail 105 at the front edge of the machine. If a sensor adjacent the end of the conveyor (adjacent the pre-feeder assembly 120) detects a thickness exceeding a threshold, the controller sends signals to the servo motors connected to the pre-feed arms 128, 142. In response to the signals, the servo motors drive the linkages to lift the arms.

Once the pivots arms 128, 142 are raised, the drop conveyor 100 continues to drive the packet forwardly into the pre-feeder assembly. A first sensor between the first and second pre-feeder is operable to detect the leading edge of the packet. For instance, the first sensor may be a beam break sensor, such as an emitter and receiver pair. If the first sensor detects the leading edge of the thick packet, the leading edge of the packet has entered the first pre-feeder 122. Therefore, the servo motor 125 de-actuates, pivoting arm 126 clockwise (from the perspective of FIGS. 4-5) which reduces the spring force pulling on post 133 of pivot arm 130. As a result, the first pre-feed arm pivots downwardly so that drive roller 128 contacts the top document in the packet. The second servo motor may also be de-actuated to allow the second pre-feed arm to lower at the same time. However, to limit the likelihood that the second pre-feeder lowers before the packet enters the pre-feeder, the second servo motor is de-actuated after the first servo motor. Specifically, a second sensor downstream from the first sensor may control de-actuation of the second servo motor. Specifically, the second sensor may be positioned closer to the second pre-feeder assembly 140 and when the leading edge of the packet is detected by the second sensor, the controller controls the second servo motor to lower the second pre-feeder arm 130 so that the upper wheel of the second pre-feeder lowers into contact with the top document in the packet of documents.

As described above, the first pre-feeder 122 and the second pre-feeder 140 cooperate to drive documents toward the feeder 160. The first and second pre-feeders may be controlled in tandem, however, in the present instance, the first pre-feeder 122 is controlled independently of the second pre-feeder. For example, a first clutch 195 may control engagement of the first pre-feeder. More specifically, a first drive belt 198 may drive the driven roller 128 of the first pre-feeder. The first clutch 195 is operable to engage and disengage the first drive belt with the drive motor. Similarly, a second clutch 197 may control engagement of the second pre-feeder. Specifically, a second drive belt 199 may drive the driven roller 142 of the second pre-feeder. The second clutch 197 is operable to engage and disengage the second drive belt with the drive motor. Additionally, rather than a single drive motor for both the first and second pre-feeders, the pre-feeder assembly 120 may include two separate drive motors to drive the drive rollers 128, 142. Further still, in the present instance, the drive motor that drives the first and second pre-feeders 122, 140, may also drive the feeder 160. If a single drive motor is used to drive both pre-feeders and the feeder, the system may include a third clutch that selectively engages and disengages the feeder with the drive motor.

Figure 4:
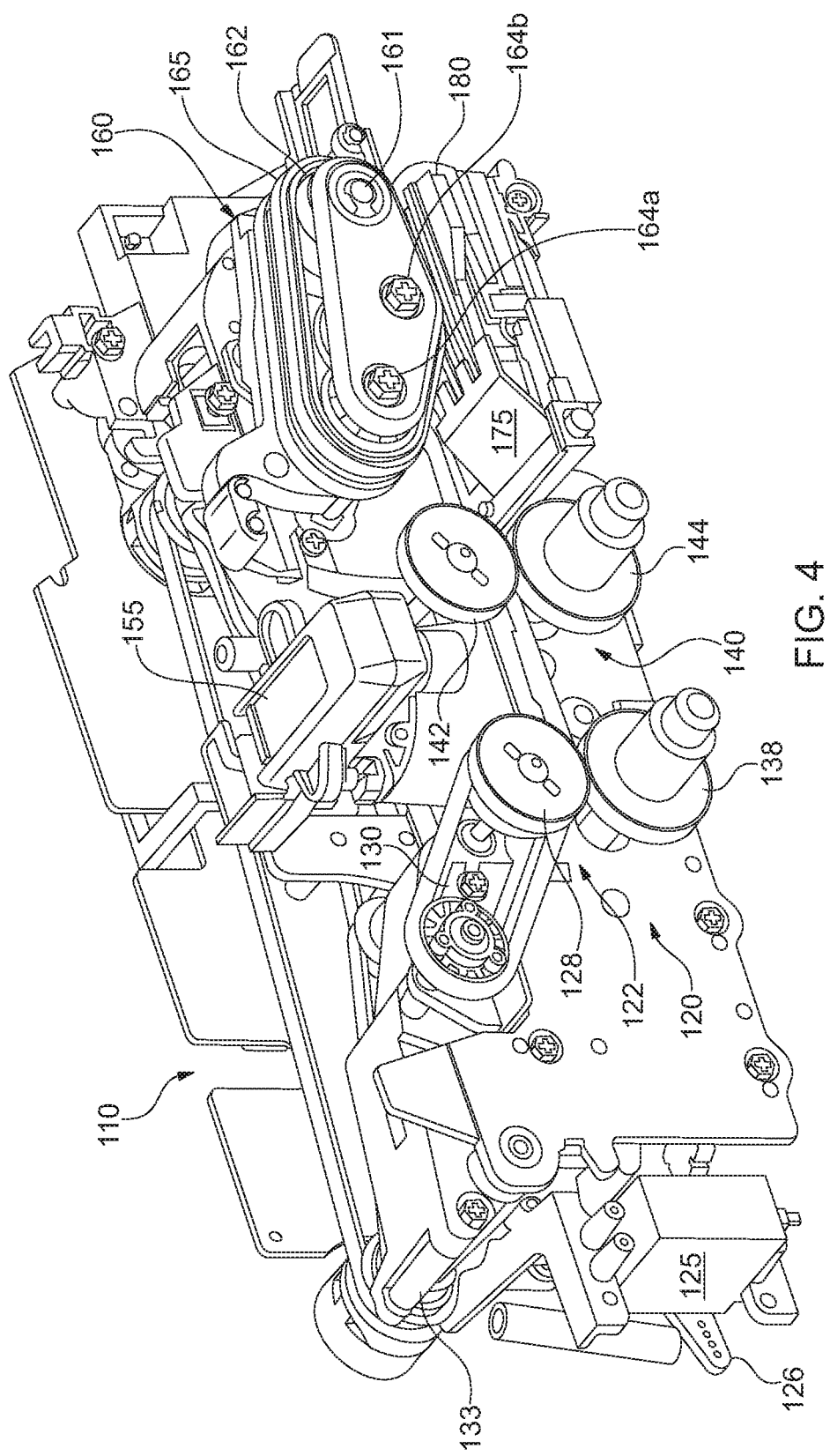
FIG. 4 is an enlarged fragmentary view of the image entry feeder of the system illustrated in FIG. 2.
Figure 5:
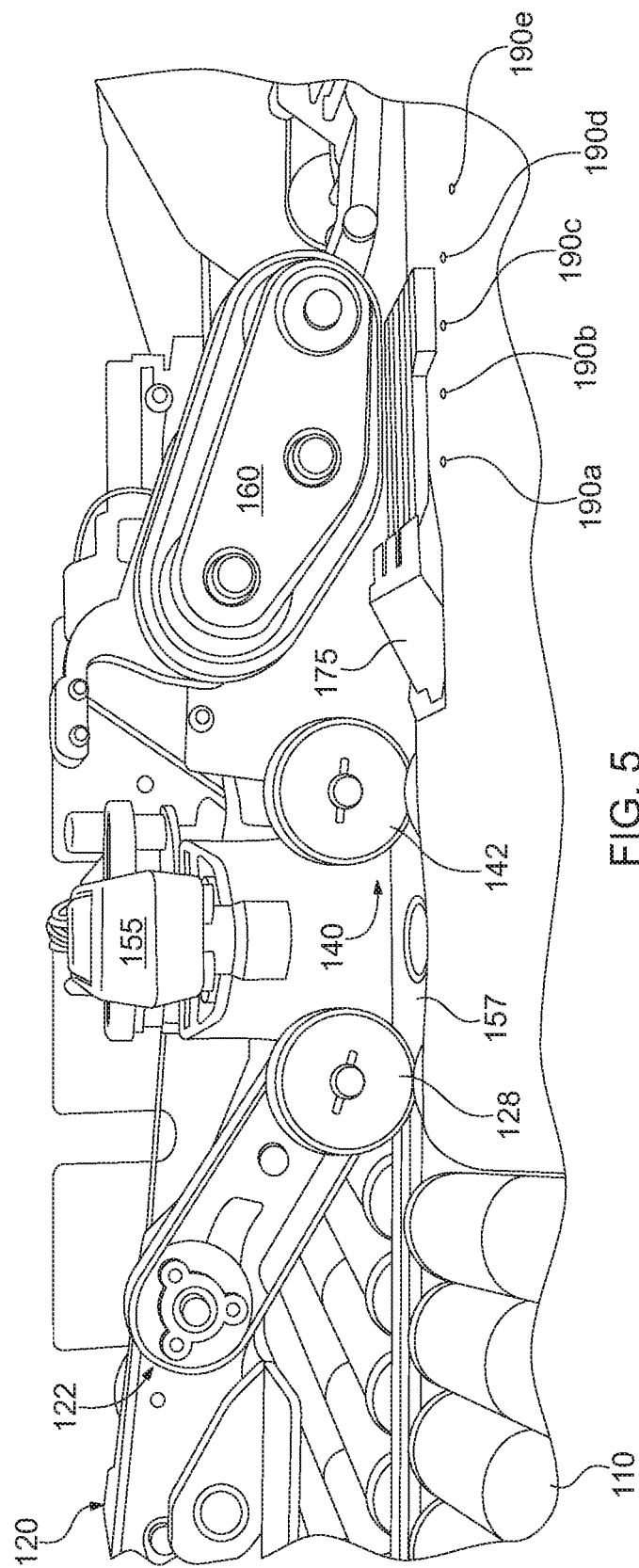
FIG. 5 is a side elevational view of the image entry feeder illustrated in FIG. 4.

As shown in FIGS. 4-5, a packet detector 155 is positioned between the first pre-feeder assembly 122 and the second pre-feeder assembly 140. The packet detector may be configured to provide indicia of the number of documents being conveyed from the first pre-feeder assembly 122 to the second pre-feeder assembly. In one manner, the thickness detector may determine the thickness of the document or packet of documents and then estimates the number of documents based on the assumed thickness for an individual document. However, in the present instance, the thickness detector 155 does not directly measure the thickness of the document or packet. Instead, the thickness detector 155 is an ultrasonic detector that uses ultrasound waves emitted from a transmitter and received by a receiver. Based on the signals received by the receiver, the number of transitions between sheets of papers can be determined to evaluate how many documents are in a stack. More specifically, the packet detector 155 detects whether the transaction in the pre-feeder is a packet of two or more documents as opposed to a single document.

Feeder Station

The feeder 160 includes a plurality of feedbelts 165 spaced apart from one another across the width of the image entry feeder module 110. Although a single wide belt could be used, in the present instance, the feeder incorporates parallel belts mounted about a plurality of rollers. Specifically, in the present instance, the feeder 160 includes a drive roller 162 mounted on a drive shaft 161. The feedbelts 165 are also entrained about a pair of driven rollers 164a, 164b as shown in FIGS. 4-5. Roller 164a, 164b may be aligned with the drive roller 162 to create an upper belt run and a parallel lower belt run. However, in the present instance roller 164b is offset from a line passing through the axis of drive roller 162 and driven roller 164a. In this way, the lower run of feed belts 165 have a first portion angled downward and a second portion angled upwardly as shown in FIGS. 4-5. The rollers 162, 164 are rotatably mounted between a pair of mounting brackets. The front mounting bracket is a flat arm, whereas the rear mounting bracket includes an attached lifting arm for pivoting the feeder.

The feeder 160 is driven by drive shaft 161, and is also pivotable about the drive shaft. For instance, in FIGS. 4-5 the feeder 160 is pivoted downwardly into an operation position in which the feeder can feed documents. However, the feeder 160 may be pivoted upwardly about drive shaft 161 (clockwise from the perspective of FIG. 5) to allow removal of documents that may be jammed in the feeder.

A retard mechanism 180 is disposed below the feeder 160 opposing the feeder to selectively impede the entrance of documents into the feeder. The retard mechanism 180 selectively cooperates with the feed belts 165 to separate the documents in a packet. An angled ramp guides documents exiting the nip of the second pre-feeder assembly 140, and directs the documents toward the area between the feeder belts 165 and the retard assembly 180. The retard mechanism 180 includes a high friction retard pad 182.

Control of Packet Advancement

If the packet detector 155 determines that the transaction is only a single document, the transaction does not need to be singulated by the feeder, so the document continues through the pre-feeder assembly 120 without being stopped. In contrast, if the packet detector determines that the transaction travelling from the first pre-feeder 122 to the second pre-feeder 140 has two or more documents then the packet is advanced to the feeder 160 and stopped at the feeder so that the feeder can singulate the documents in the packet.

As discussed further below, once the system determines that a transaction is a packet, the system may control the advancement of the packet based on the number of documents in the packet. More specifically, the distance that the packet advances before being stopped at the feeder may be controlled based on the thickness of the packet, As discussed previously, in addition to the packet detector 155, a pre-feed sensor is also provided, which senses the leading edge of a document or packet as the document or packet is conveyed through the pre-feeder assembly 120. The pre-feed sensor may be any of a variety of sensors, and the functionality of the pre-feed sensor may be combined with the functionality of the packet detector 155. However, in the present instance, the pre-feed sensor is a separate sensor in the form of an infrared transmitter and receiver disposed between the first pre-feed assembly and the second pre-feed assembly. More specifically, the pre-feed sensor is mounted on the circuit board on which the ultra sound detector 155 is mounted, which is disposed between the first pre-feed assembly 122 and the second pre-feed assembly 140. Further still, a second pre-feed sensor is also provided. The first pre-feed sensor is disposed upstream from the packet detector 155 while the second pre-feed sensor is positioned along the document path downstream from the packet detector. Both pre-feed sensors are the same type of sensors and are located along the paper path so that the system can track the leading edge of the packet as the packet exits the first pre-feeder 122 and enters the second pre-feeder 140.

From the second pre-feeder assembly 124, the documents enter the feeder 160. Specifically, a feed slot is formed between the feeder 160 and a retard assembly 180 below the feeder. An angled ramp 175 guides documents exiting the nip of the second pre-feeder assembly 140, and directs the documents toward the area between the feeder belts 165 and the retard assembly 180. As discussed further below, the angled ramp 175 and the feeder 160 combine to form a convexly angled or tapered entrance slot to the feeder. In this way, the height of the entrance slot (i.e. the distance between the ramp 175 and the feed belts 165) tapers down as the document path progresses downstream through the entrance to the feeder until the height of the entrance slot reaches a minimum about midway along the length of the feeder.

If a packet of documents is fed through the pre-feeder assembly 120, the feeder operates to singulate the documents in the packet so that each document is serially fed into the imaging station 210. If instead of a packet, a single document is fed through the pre-feeder assembly 120, the single document simply passes through the pre-feeder and is fed by the feeder 160 to the imaging station 210.

By incorporating a tapered entrance slot, the feeder can accommodate a wider variety of packet thickness without having to pivot the feeder to create a feed slot thick enough to accommodate packets having numerous documents while at the same time being able to control single document transactions and/or transactions having only a few documents.

Specifically, the system controls the advancement of packets through the pre-feeder 120 based on the thickness of the packet. In particular, the distance a packet is advanced into the entry slot of the feeder is inversely related to the thickness of the packet. For instance, a packet of 100 sheets has a packet thickness of roughly 0.400" whereas a packet of 10 sheets has a packet thickness of roughly 0.040"". Since the entrance slots tapers, the packet of 10 sheets can advance farther into the feed slot until the upper sheet contacts the feed belts, which form the upper surface of the entry slot. In contrast, the packet of 100 documents will not have to advance as far into the entry slot before the upper sheet in the packet contacts the feed belt.

Accordingly, in order to control the advancement of the packets, the system detects the thickness of the stack and monitors the advancement of the packet to stop the stack at the appropriate location relative to the feeder. A variety of sensors or detectors can be used to detect the thickness of the packet. However, in the present instance the system determines the thickness of the packet based on the displacement of the pivot arm of the first pre-feeder 122. Specifically, a pair of optical sensors is provided, with each having an emitter and a corresponding receiver. The optical sensors are positioned next to one another with the first being positioned vertically above the second pair. The optical sensors detect the movement of an indicator attached to the upper pivot arm 130 of the first pre-feeder. The optical sensors straddle the indicator to monitor the movement of the thickness indicator as the upper pivot arm pivots to accommodate the thickness of the packet. Since the displacement of the pivot arm 130 is proportional to the thickness of the stack, monitoring the displacement of the pivot arm can roughly determine the thickness of the packet.

Figure 6:
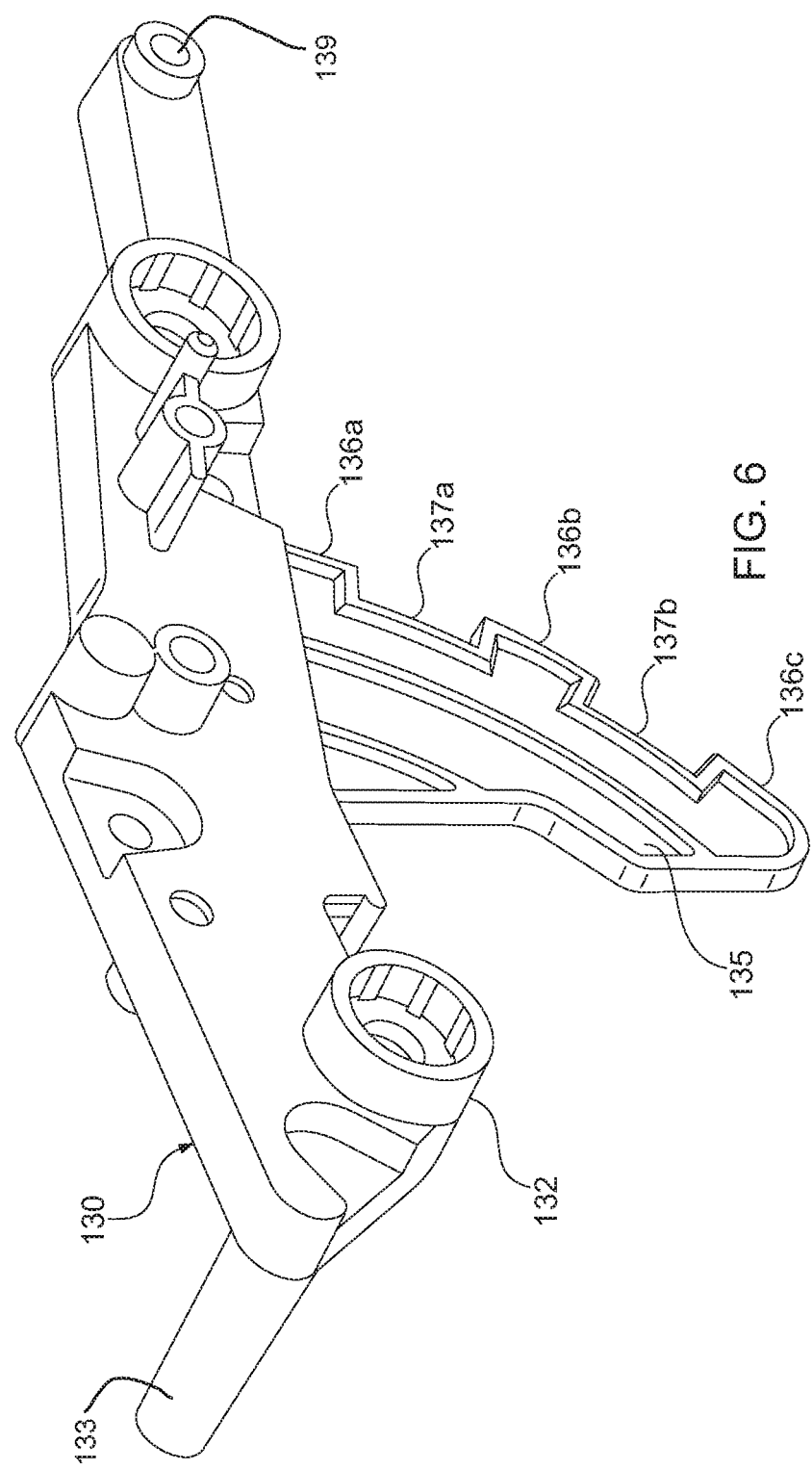
FIG. 6 is a perspective view of a pivot arm of the image entry feeder illustrated in FIG. 4.
Figure 7:
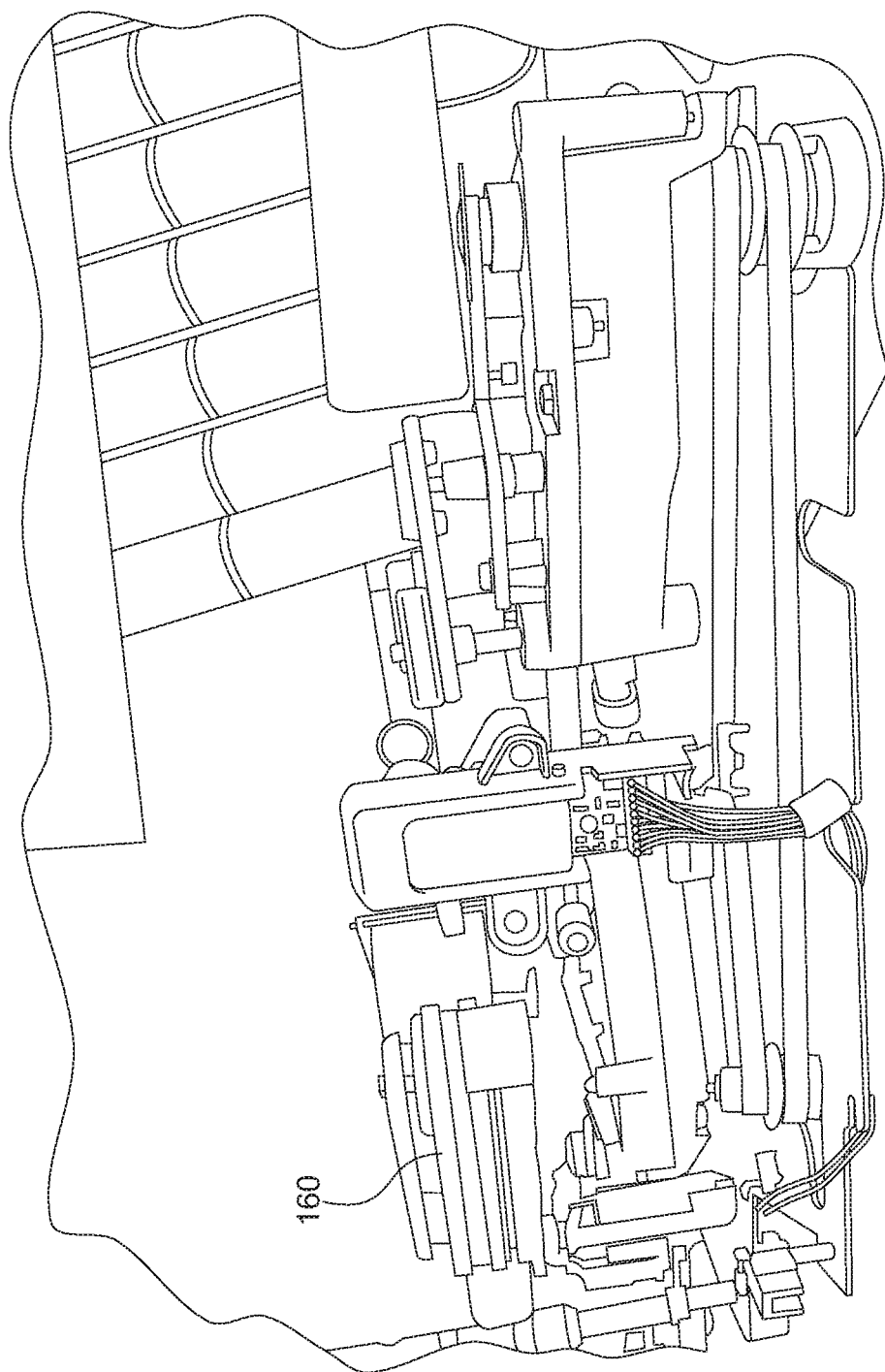
FIG. 7 is a plan view of the image entry feeder illustrated in FIG. 4.
Figure 8:
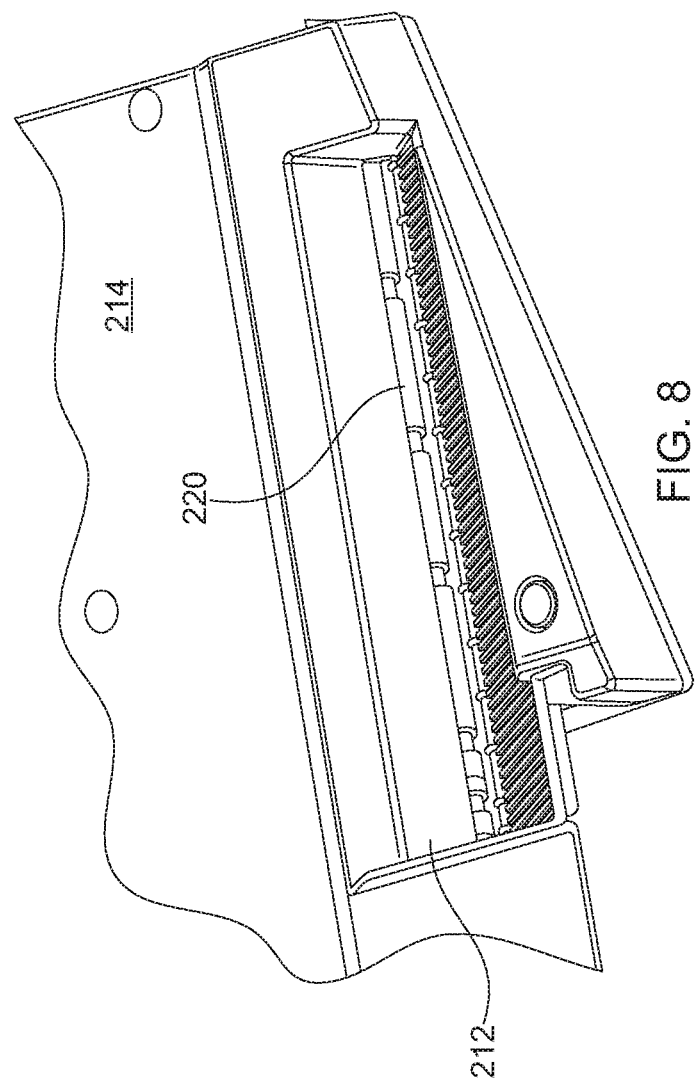
FIG. 8 is a fragmentary plan view of a portion of the imaging station.

Referring to FIG. 6, the details of the thickness indicator 135 are illustrated. The thickness indicator 135 comprises a series of teeth 136 separated by notches 137. A single optical sensor could be used to detect the movement of the thickness indicator 135. Specifically, in the instance of an infrared optical sensor having an emitter and a corresponding receiver, the emitter is positioned on a first side of the thickness indicator 135 while the receiver is positioned on the other side of the thickness indicator so that the thickness indicator passes between the emitter and the receiver (i.e., the optical sensor straddles the thickness indicator). The sensor is positioned so that the sensor is blocked when a tooth 136 is aligned with the sensor and so that the sensor is unblocked when a notch 137 is aligned with the sensor. In this way, the sensor detects the number of translations from blocked to unblocked and from unblocked to blocked as the pivot arm 130 pivots to accommodate the thickness of the packets—as previously mentioned, the thicker the packet, the further the pivot arm pivots to accommodate the packet.

Although a single sensor can be used to detect the packet thickness, in the present instance a pair of optical sensor are aligned in a stacked formation. By way of example, if upper tooth 136a blocks both optical sensors when no packet is in the first pre-feeder 122, the pivot arm 130 will pivot upwardly (counter-clockwise) as the packet pushes the pivot arm upwardly. As the pivot arm 130 pivots, the lower sensor will first detect a transition from blocked to unblocked as when the upper edge of the first notch aligns with the lower sensor. As the pivot arm continues to pivot upwardly, the upper sensor will detect the transition from the first tooth 136a to the first notch 137a. This detection of transitions will continue for the two sensors as the pivot arm pivots upwardly so that the sensors detect the transition from the first notch 137a to the second tooth 136b then to the second notch 137*b* until sensing the transition from the second notch 137*b* to the third tooth 136*c*. In this way, the thickness of the packet is related to the number of transitions detected by each of the optical sensors.

Conversely, as the feeder 160 singulates the documents in the packet, the thickness of the packet will reduce, thereby causing the pivot arm 130 to pivot downwardly, which in turn will cause the optical sensors to detect the opposite transitions from when the pivot arm move upward to accommodate the thickness of the packet. Accordingly, the system is operable to continuously monitor a characteristic indicative of the thickness of the packet while a portion of the packet is in the first pre-feeder.

As discussed previously, when processing a packet, particularly a thick packet, it may be desirable to pivot the pivot arms 130, 143 of the prefeeders upwardly so that the front edge of the packet does not collide with the drive rollers 128, 142, which could disrupt the packet of documents and cause the packet to shingle or unstuck prematurely. If the arms are raised before receiving the packet, the packet thickness described above can still be used. Specifically, when the pivot arm of the first pre-feeder is raised up, the thickness indicator will be pivoted upwardly so that the sensors will detects the pivoting of the pivot arm similar to that described above when the packet pushes the pivot arm upwardly. After the arms are lifted and the packet enters the pre-feeder 120, the servo 125 reverses direction thereby driving arm 126 clockwise. Raising arm 126 relaxes the spring thereby decreasing the biasing force that lifts the pre-feed arm 130 (i.e. the tension force between arm 126 and post 133 of arm 130). In response, the pre-feed arm 130 pivots downwardly toward the stack. Specifically, in the present instance, a biasing element is disposed between the frame of the pre-feeder and the end 139 of arm 130 opposite post 133. The biasing element biases the pre-feeder arm 130 against counter-clockwise rotation, so that the biasing element biases the first pre-feed roller 128 downwardly toward the opposing roller 138. After the pivots arm is released, the sensors will detect the downward pivoting of the arm 130 similar to when the arm pivots downward when the packet height is reduced as the feeder singulates the documents. Accordingly, regardless of whether the packet pushes the pivot arms up or whether the system drives the pivots arms up and then releases them, the thickness detector made up of the thickness indicator and the optical sensor(s) can continuously detect and monitor the packet thickness in the first pre-feeder. As the height of the packet reduces, the servo motor 125 raise arm 126 to decrease the bias force that tends to lift the arm 130. In this way, as the documents are fed from the packet, the system controls the displacement of arm 126 to balance the tension force lifting roller 128 away from the top of the packet and the tension force pulling the roller 128 down toward the top of the packet to maintain the force of roller 128 against the packet at a substantially constant rate.

The system also tracks the leading edge of the packet as the packet advances through the pre-feeder assembly 120 toward the feeder 160. For instance, the system may include a series of sensor 190*a*, 190*b*, 190*c*, 190*d*, 190*e*, 190*f* aligned along the document path adjacent the feeder 160. As the packet advances toward and into the feeder the leading edge of the packet sequentially blocks the sensors 190*a-f*. For instance, as the packet advances toward the feeder, the leading edge of the packet first blocks sensor 190*a*. If the packet is advanced further, the leading edge of the packet blocks sensor 190*b*. This continues until the packet is stopped at the feeder to stage the packet for singulation.

Accordingly, after determining the thickness of the packet, the pre-feeder assembly 120 advances the packet toward the feeder. The distance that the packet is advanced toward the feeder correlates with the thickness determined for the packet. For instance, if the system determines that the packet has a thickness similar to a packet of 100 documents, the packet may be advanced until the leading edge of the packet covers feeder sensor 190*a*, at which point the packet is stopped to stage the packet at the feeder. If the system detects a packet having a lower thickness, such as a thickness similar to a packet of 50 documents, the packet may be advanced farther into the feeder, such as until the leading edge of the packet covers sensor 190*c*, at which point the packet is stopped to stage the packet at the feeder for singulation. Additionally, after the packet is staged and the feeder begins singulating the packet, the height of the packet will reduce. When the detected thickness of the packet reduces below a threshold, the packet may be advanced further into the feeder. For instance, turning to the example described above, once the packet of 100 documents is reduced down to 50 documents, the packet may be advanced until the leading edge of the packet covers sensor 190*c*.

In the foregoing discussion, the advancement of the packet through the pre-feeder assembly 120 is controlled based on the detected thickness of the packet as well as the position of the leading edge of the packet. However, it should be understood that other factors may also affect the advancement of the packet through the pre-feeder assembly. For instance, the system tracks the trailing edge of a first packet and the leading edge of the following packet. In order to ensure a proper gap between successive packets, the advancement of a packet may also depend on the detected gap between the packet and the preceding packet.

In addition to the elements described above, the flow of documents through the image entry feeder module 110 may also be controlled based on signals received from sensors in the imaging station 210. For instance, the imaging station 210 may include a feeder exit sensor 215 positioned downstream from the feeder 160, but upstream of crusher rollers 220 that engage the documents to control the transport of the documents through the imaging station 210. The feeder exit sensor 215 may be any of a variety of sensors that are operable to detect the leading and/or trailing edge of a document. In the present instance, the image entry sensor 215 is an infrared transmitter/receiver sensor.

As discussed above, when processing a packet, the system detects whether the transaction is a packet or a single document. If the transaction is a packet of documents, the system evaluates a measurement of the packet thickness. The packet is then advanced until the leading edge of the packet is positioned at the appropriate location relative to the feeder. Specifically, the leading edge of the packet is advanced into the feeder entry slot. The distance that the packet advances into the feeder entry slot may determined based in part on the packet thickness. Once the leading edge of the packet is advanced to the desired position in the feeder, one or both of the pre-feeders is disengaged. As discussed above, each pre-feeder is controlled by a separate clutch 185, 197 so that they pre-feeders can be independently engaged and disengaged.

By way of example, if the leading edge of the packet blocks the third sensor 190*c*, the first clutch may be disengaged to disengage the drive force provided to drive roller 128 of the first pre-feeder. However, the second pre-feeder may remain actuated to urge the top document in the packet toward the feeder. The feeder 160 will continue to serially feed documents from the packet as long as the downstream documents continue to advance.

If the leading edge of the packet covers the fourth feeder sensor 190*d*, the second clutch 197 may be disengaged to disengage the drive force provided by the drive roller 142 of the second pre-feeder. The feeder 160 may continue to serially feed documents from the packet as long as the downstream documents continue to advance. If there is an insufficient gap between the leading edge of the top document in the packet and the trailing edge of the preceding document, the drive motor may be turned off so that the feeder does not feed further documents from the stack. When the preceding piece advances sufficiently, the motor is re-started, but only the feeder is actuated; both pre-feeders remain disengaged. The second pre-feeder may be re-engaged once the third feeder sensor 190*c* is no longer covered by the leading edge of the packet. Additionally, once the feeder 160 feeds a sufficient number of documents from the packet that the first feeder sensor 190*a* is uncovered, the first clutch may be re-actuated to re-engage the first pre-feeder 122 so that both pre-feeders drive the packet toward the feeder as described previously. This process can iteratively proceed until the feeder feeds all of the documents in the packet, at which time the next packet is advanced.

Additionally, the imaging station 210 may include a sensor that detects the leading edge of documents downstream from the crusher roller prior to the documents entering the imager. At this point, the documents are entrained by the crusher roller 220 and no longer controlled by the image entry feeder module 110. The sensor may also be operable to detect the thickness profile of a document. The thickness profile can then be evaluated to determine a characteristic about the document. For instance, the profile for two documents as detected by the ultrasound sensor 155 is similar to the profile for an envelope. However, the thickness profile for an envelope has characteristics that distinguish the envelope from two sheets of paper due to the changes in thickness over the length of the envelope resulting from the seams of the envelope.

Configured as described above, the image entry feeder module 110 operates as follows. The drop conveyor 100 conveys one or more documents to the image entry feeder module 110 to feed the document(s) to the imaging station 210. If the document(s) is creased or otherwise sticking up from the drop transport 100, the entry guide 115 deflects the document(s) toward the first pre-feed assembly 124. The document(s) enter the nip between the drive roller 128 and the driven roller 130. As the documents enter the nip, the drive roller or upper roller 128 is displaced away from the lower driven roller 130 to provide clearance of the document(s). A thickness detector detects the displacement of the pivot arm 130 as the upper roller moves away when the documents enter the nip of the first pre-feed assembly. Alternatively, rather than thickness detector, a signal from ultrasonic detector 155 indicative of a thick packet of documents may be used. The signal from the thickness detector or ultrasonic detector is communicated with the central controller, and if the thickness detected exceeds a predetermined threshold, then the packet is considered a thick packet, and the drop conveyor 100 is stopped until the thick packet has been fed to the imaging station by the image entry feeder module 110. Specifically, the system does not advance documents into the first pre-feed assembly 122 until the document(s) being fed from the second pre-feed assembly 124 to the feeder 160 are finished being fed. For instance, if the feeder 160 is feeding a packet of five documents to the imaging station 210, it is desirable to maintain the grouping of the packet, without mixing the documents in the packet with other documents. Therefore, no further documents are advanced into the second prefeed assembly while that feeder 160 is finishing singulating the documents in the packet. Once the final document in a packet clears the second pre-feed assembly, the system sends a signal to the document transport to advance the next document or packet of documents from the drop feeder 100 to the pre-feed assembly 120.

The image entry feeder 110 module processes single document differently than a packet. Specifically, as the single document passes the ultrasonic thickness detector 155 the detector determines whether the transaction is a single document or a packet. If the detector 155 determines that the transaction is a single document, the document continues through the second pre-feed roller without stopping.

In contrast to the example of a single document, when a packet of documents is fed to the pre-feeders, the ultrasound detector 155 detects a transaction profile that is indicative of a packet rather than an individual document. In response to a signal from the system that the transaction is a packet, the brake may be energized. Specifically, once the transaction is determined to be a packet, the brake may be energized a predetermined time delay after the time that the leading edge of the packet is detected by the pre-feed sensor. However, it may be desirable to energize the brake for each transaction regardless of the whether the transaction is a single document or multiple documents.

The timing of braking is independent from the timing of the determination that the transaction is a packet. In other words, the timing of the brake is not measured from the time that the system determines that the transaction is a packet. In fact, in typical operation, the pre-feed sensor may detect the leading edge of a transaction before the system determines whether or not the transaction is a packet in response to the signals from the ultrasound detector 155. Nonetheless, once the determination is made, the timing of the brake actuation is measured from the time that the leading edge passed the pre-feed sensor.

Since the brake is connected to the drive shafts for the lower rollers of pre-feeders 122, 140, actuating the brake impedes displacement of the lower rollers of the pre-feeders 122, 140. By braking the lower rollers and continuing to drive the upper rollers to drive the packet forward, the top documents in the packet are shifted forwardly relative to the lower documents. In this way, the upper rollers tends to shift the documents in the packet forwardly relative to the bottom documents, causing the packet to shingle so that the leading edge of the top document overhangs the lead edge of the second document in the packet, which overhangs the lead edge of the third document in the packet, and so on, down to the bottom document in the packet. Shifting the top document(s) forwardly facilitates improved singulation of the packet relative to a packet in which the top document in a packet is disposed rearwardly of the documents below in the packet.

Once the top document in a packet enters the feeder 160, the feeder belts 165 drive the document through the feeder toward the imaging station 210. In this way, the feeder separates the lead document from the remaining documents in the packet, thereby singulating the document. As the leading edge of the document leaves the feeder 160, the feeder exit sensor 215 senses the leading edge of the document. In response, the pre-feed clutch 197 may disengage the driving force transmitted to the upper pre-feed rollers via the pre-feed drive belts 198, 199. Disengaging the pre-feed upper rollers, reduces the tendency of the rollers to buckle the documents, which can occur in response to driving the packet forward toward the feeder while the retard holds the documents back.

After the lead document passes the feeder exit sensor 215, the leading edge of the document enters the nip formed between the crusher rollers 220. The crusher rollers 220 positively entrain the document and have greater frictional control over the document than the frictional force between the feeder 160 and the document. Therefore, the feeder 160 does not need to drive the document forwardly in order to continue to advance the document. Accordingly, once the leading edge of the document is detected by the sensor downstream from the crusher rollers 220, such as the thickness detector (or a separate sensor detector similar to the feeder exit sensor 215), it is known that the document is entrained by and therefore controlled by the crusher rollers. Therefore, to reduce the likelihood of the feeder 160 feeding the second document in the packet before the first document is completely fed (commonly referred to as a double-feed), the controller may turn off the drive motor, thereby stopping the feeder 160. Despite the fact that the feeder is stopped, the crusher rollers 210 entrain the document with sufficient frictional force that the crusher rollers drive the document forwardly, pulling it out of the feeder. A one-way overrun clutch allows the belt roller to spin while the feeder motor is stopped while the crusher rollers pull the document out. Once the feeder exit sensor 215 senses the trailing edge of the document, the controller then actuates the drive motor 190 to re-start the feeder to feed the next document in the packet in the same way that the previous document was fed. Additionally, the clutch 197 is actuated to re-connect the pre-feed drive belts 198, 199 with the motor 190, so that the upper rollers of the pre-feed assemblies 122, 140 urge the packet toward the feeder 160.

Imaging Station

From the image entry feeder module 110, the documents serially enter a nip formed between a pair of crusher rollers 220. Although the entry feeder holds the documents down, it does not flatten the documents; it generally just holds an edge of the document flat against the base plate of the feeder. In contrast, the crusher attempts to flatten the creased documents.

The crusher rollers 220 are elongated cylindrical aluminum rollers 222 having a smooth surface. A plurality of elastomeric gripping rings 224 are formed around the circumference of the roller 222, and spaced apart from one another. Preferably, a first gripping ring is positioned at the end of the roller 224 closest to the entry feeder 110, and a second gripping ring is positioned on the roller a couple inches away. More specifically, preferably the second gripping ring is spaced inwardly less than the width of the feeder 110. In addition, preferably a third gripping ring is positioned adjacent the opposite end of the roller. The first and second gripping rings 224 provide nips that drive the paper from the entry feeder to the imager 230. The third gripping rings are positioned so that they are not in the paper path (i.e. the third gripping rings do not engage the documents. Instead, the third gripping rings provide spacing to maintain the rollers parallel with a constant gap.

Preferably, the first two gripping rings 224 on the rollers 222 are positioned so that both rollers engage a single fold for documents that are tri-folded with the fold lines disposed parallel to the paper path. In this way, the gripping rings engage the edge-justified third of the tri-folded document, while the rest of the document can slide across the width of the crusher roller since the remaining width of the crusher roller in the paper path is aluminum. In this way, the crusher roller flattens the documents without buckling the documents.

Figure 10:
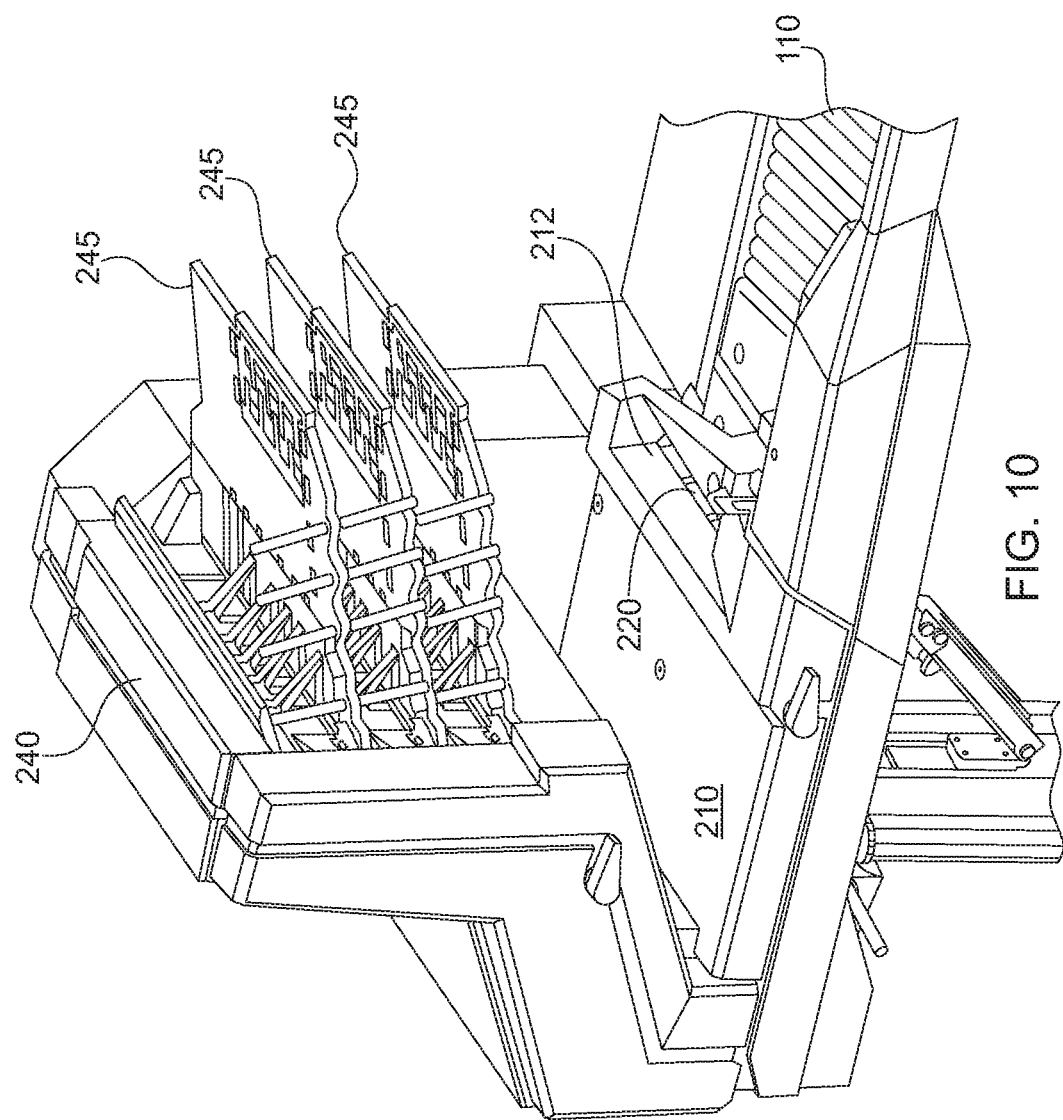
FIG. 10 is a fragmentary view of the device illustrated in FIG. 2.

Referring now to FIGS. 9-10, a crusher slot 212 is provided. As discussed above, the feeder 160 feeds documents to the crusher roller 220. A cover 214 covers the document path. The cover 214 is spaced off of the base plate of the machine so that the feeder pulls the documents under the cover and through the gap to feed the documents to the crusher rollers 220. As discussed previously, the documents are in a horizontal relationship as the feeder 160 drives the documents toward the crusher rollers 220.

The crusher slot 212 is formed in the cover 214 adjacent the crusher rollers 220. Specifically, the crusher slot 212 extends through the cover 214 to direct documents to the nip of the crusher rollers 220. The crusher slot extends into the gap between the cover 214 and the base plate of the paper path. In this way, the crusher slot is disposed immediately downstream from the feeder 160. Documents can be dropped into the crusher slot 212 and an angled ramp in the crusher slot will direct the leading edge of the document into the nip of the crusher rollers so that the document is pulled into a substantially horizontal orientation so that the document can be processed through the imager 230 and then sorted by the sorting station 240.

A plurality of feeder exit sensors are disposed in the feeder between the image entry feeder module 110 and the crusher roller 220. After passing the feeder exit sensors and the crusher roller 220, the document passes through a thickness detector that measures the document at a plurality of points along the length of the document.

From the thickness detector, the document enters the imager 230. Preferably the imager comprises a pair of scanners for scanning both sides of the document. Specifically, preferably the imager 230 includes a lower plate in which the lower scanner 230 is located, and an upper plate in which the upper scanner is located. The lower scanner 230 scans the bottom face of the document, and the upper scanner scans the upper face of the document. As shown in FIG. 4 preferably the upper plate of the scanner is pivotable upwardly away from the lower plate to allow access into the imaging station 210 in the event of a jam in the imaging station.

Although the scanners may be black and white or gray scale, preferably, the scanners 230 are color scanners. More specifically, preferably the scanners 230 are contact image sensor (CIS) modules formed of arrays of photodiodes that operate as scanning elements, and LED light sources.

Figure 12:
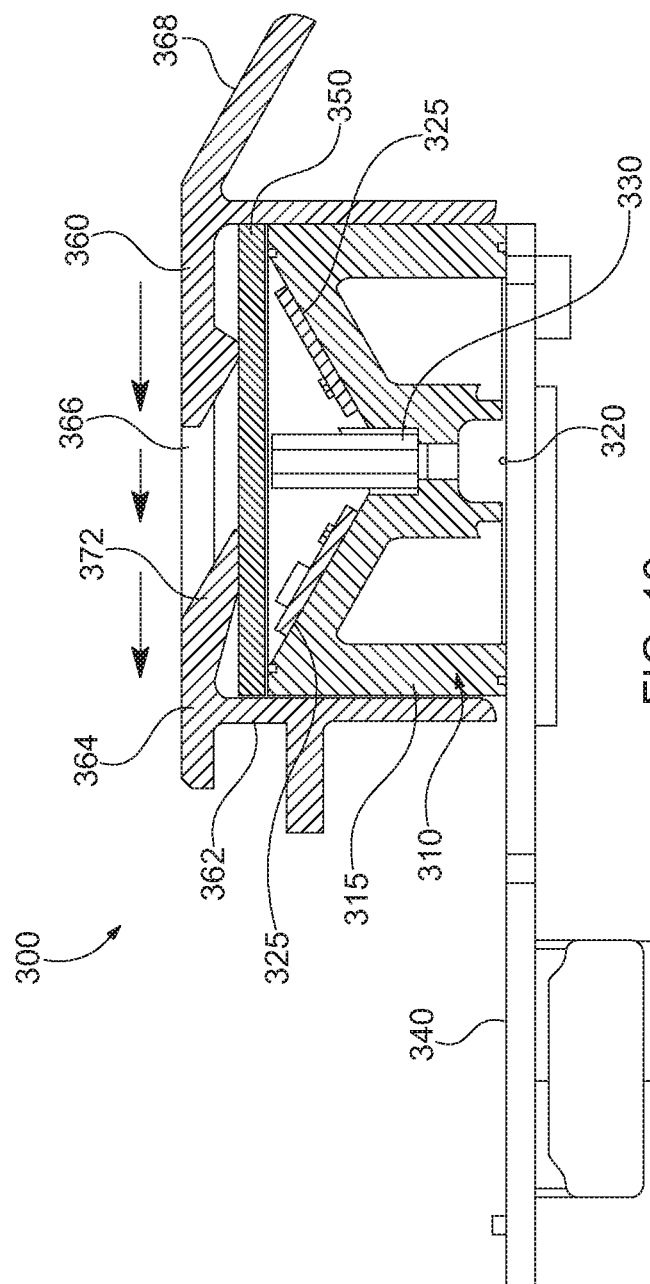
FIG. 12 is an enlarged fragmentary view of an alternate imaging sensor assembly of the device illustrated in FIG. 2.

Referring to FIG. 12, details of an imaging assembly 300 are illustrated. The imaging assembly 300 may be incorporated into the imager 230 of the imaging station 210.

The imaging assembly 300 comprises an elongated housing 310 that extends across the width of the document path. The housing 310 is shaped similar to an elongated channel having side walls 315. It should be noted that FIG. 12 is a cross-sectional view along the length of the channel. A central slot in the base of the housing forms a socket into which the imaging sensor 320 is positioned. It should be understood that the imaging sensor comprises a series of elements extending along the length of the channel so that the imaging sensor is able to obtain image data along the width of the paper path.

A pair of angled shoulders in the housing provide support surfaces onto which illumination elements are mounted. For instance, LED arrays 325 are mounted onto the angled shoulders to illuminate the documents as the documents are conveyed over the imaging assembly 300. A lens 330 may be positioned over the imaging sensor 320. For instance, in the present instance, a focusing rod lens array is provided. The imaging sensor is in electrical communication with the contact image sensor PCB circuit.

A glass covering or lens 350 encloses the upper end of the housing 310. In the present instance, the glass 350 is a generally planar element forming a flat plate. The light elements 325 are disposed at angle to the surface of the glass, while the imaging sensor 320 is substantially perpendicular to the glass covering.

A cap 360 overlies the glass covering 350. The cap 369 comprises an elongated channel formed of two spaced apart legs 362. The legs 362 are spaced apart a distance corresponding to the width of the imaging housing 310 so that the cap can clip onto the housing to fix the position and orientation of the cap relative to the housing, which in turn fixes the position of the cap relative to the imaging sensor 320.

The cap 360 further includes a top face 364 that overlies the glass lens 320. A slot 366 through the thickness of the top face of the cap provides an aperture through which the imaging sensor can obtain image data for the documents to be scanned. As shown by the arrow in FIG. 12 extending from right to left, the arrow indicates the direction of travel for the documents as the documents pass over the imaging assembly 300. A tapered surface or ramp 368 guides the documents onto the top surface 364 of the cap 360 as the documents pass over the imaging assembly. Additionally, the trailing edge of the slot 366 in the cap 360 tends to direct the document along the paper path when the leading edge spans the slot 364. More specifically, the tapered lip 372 impedes the leading edge from curling down into the slot and potentially buckling down into the slot.

The top surface of the cap 364 forms the focal plane for the imaging sensor 320. However, the top surface of the cap is spaced apart from the glass and dust will tend to settle onto the glass. Since the upper surface of the cap is the focal plane and since the upper surface is spaced apart from the glass by a gap, the dust is outside of the depth of view of the imaging sensors. Therefore, the duct will have reduced impact, if any impact at all, on the image quality.

As the document passes between the scanners, the scanners scan the faces of the document to obtain image data representing a color image of the document faces. The image is communicated with the system computer and the image data is stored in a data file associated with the document.

From the scanner, the document is conveyed to a MICR detector, which attempts to read any MICR markings on the document. Specifically, MICR markings are printed in magnetizable ink. The MICR detector includes a magnet that exposes the document to a magnetic field. The MICR detector also includes a MICR reader that scans the document for magnetic fluctuations indicative of MICR characters. If the apparatus detects the presence of a MICR line, the MICR detector attempts to read the MICR line. The data representing the MICR information is then communicated with the system computer, which stores the MICR data in a data file associated with the document.

Imaging Transport

The imaging transport extends between the imaging station 210 and the sorting station 240. Preferably the imaging transport is formed of two halves, and the upper half is pivotable away from the lower half to provide access to the transport path to remove any paper jam in the transport, or perform service on the interior element, as shown in FIG. 4.

As shown in FIG. 1, the document path between the imaging station 210 and the sorting station 240 is preferably not a straight horizontal path. Instead, preferably, the imaging transport turns upwardly and curves backwardly toward the seating area 15. Between the imaging station 210 and the sorting station 240, an optional uncreasing station and a printer may be disposed along the transport path. The uncreasing station is a guide having a sharp edge that the documents pass over as the documents turn along the transport path. If included, the printer is disposed along the transport so that the printer can print markings on the documents as they are conveyed to the sorting station 240.

The printer includes at least one ink jet printer. The printer is disposed behind covers in the imaging transport. More specifically, a first printer is preferably disposed behind a plate in the upper portion and preferably the second printer is disposed behind a plate in the lower portion. In response to signals from the computer, the printer(s) prints audit trail data onto each document. The audit trail information printed on a document includes data particular to the document, such as the document type for each document, the batch number for the document, the document number, the transaction number for the transaction of which the document is a member, and the date on which the document was processed. The audit trail information can be used to subsequently locate a particular document within a stack of documents.

Sorting Station

The sorting station 240 is disposed at the end of the imaging transport, and the sorting station includes a plurality of gates operable to sort the documents into one of a plurality of bins 245. The sorting station includes a plurality of gates that are operable to direct the documents to the appropriate bin 245. The sorting can be based on a number of criteria. For instance, the documents can be sorted according to information determined from the image data.

The documents follow a generally vertical paper path as the documents are conveyed up to the output bins 245. When the documents are directed into one of the bins, the gate re-directs the document from a generally vertical direction headed upward to a generally horizontal path over a series of output roller s 252 mounted on a rotatable axle 250. The document is the directed generally downwardly toward the output bin 245. In this way, the documents curl over the output rollers 252. As such, the leading edge of the document frequently tends to buckle under when it contacts the bottom of the output bin or the other documents in the output bin. When the documents buckle under the document fold and often deflect subsequent preventing the documents from forming a neat and compact stack in the output bin.

Figure 11:
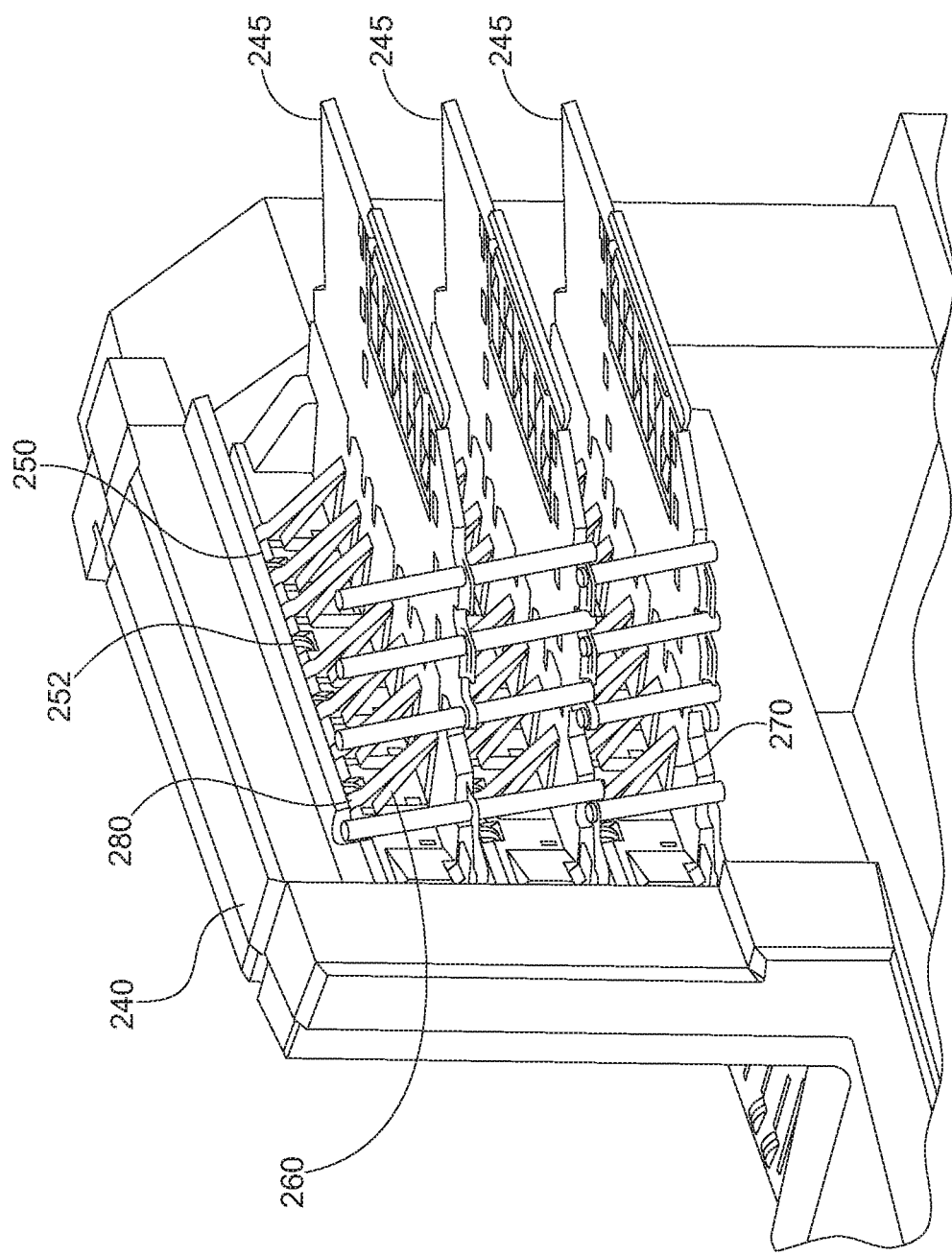
FIG. 11 is an enlarged fragmentary view of the sorter of the device illustrated in FIG. 2.

Referring to FIG. 11, in the present instance, a pair of guide elements may be provided to guide the documents into the output bin and impede the document from buckling under. Specifically, a plurality of support fingers 260 are spaced apart across the width of the output bin. The guide finger 260 form guide ramps that guide the leading edge of the documents down toward the output bin at a relatively shallow angle to prevent the lead edge from buckling under.

Each support finger 260 has a proximal end mounted adjacent the discharge slot through which the document is discharge into the output bin. The distal end of each support finger extend downwardly into a guide slot 270 formed in the base of the output bin 245. In the present instance the distal end of the support fingers form an oblique angle with the base of the output bin to impede the document from buckling under.

Additionally, a plurality of hold down fingers 280 oppose the support fingers to form a slot through which the documents are discharged. Specifically, the proximal ends of the support fingers 260 are spaced apart to provide and opening through which the documents are discharged. The support fingers support the lower face of the documents to keep the document from buckling under while the hold down fingers press against the top surface of the document impeding the document from curling upwardly. The distal end of the hold down fingers 280 rest against the support fingers when the output bin is empty or against the top document when there is a document in the output bin. Additionally, the upper or proximal end of each hold down finger 280 is pivotally connected to a support rod adjacent the discharge rollers 252. In this way, as the pile in the bin grows, the distal end of the hold down fingers are pushed upwardly and supported by the stack.

In order to promote the flow of documents into the bin, the support fingers are pressed downwardly from the weight of the documents in the bin. Specifically, as noted above, the proximal end of the hold down fingers hang from a support adjacent the discharge slot for the bin. A gap is formed between the support fingers 260 and the hold down fingers 280. In order to maintain the gap to accommodate documents being discharged into the bin, the proximal end of the support fingers move downwardly away from the proximal end of the hold down fingers 280 as more documents are sorted to the output bin.

The proximal ends of the support fingers 260 may be mounted on a horizontal rod that extends across the width of the output bin. The horizontal rod may be vertically displaceable in response to the weight of the documents pressing down against the support fingers. More specifically, one or more biasing elements may bias the horizontal support rod upwardly. As documents are discharged into the output bin 245, the weight of the documents pushes down against the support fingers 260, which in turn will tend to displace the support rod downwardly against the bias of the biasing elements.

Alternatively, rather than mounting the support fingers on a common horizontal support rod, the fingers may be independently mounted on a guide that allows the proximal end of the support fingers to be displaced vertically. Each finger may also be biased upwardly to provide the upwardly force that will support the support fingers while allowing the support fingers to move downwardly in response to an increasing weight of the stack of documents.

When configured as described above, the displaceable support fingers provide a generally constant shallow discharge angle for the documents as the documents enter the output bin. Specifically, as the documents stack up in the bin, the support fingers move downwardly so that the position of the top documents in the output bin relative to the hold down fingers stays relatively constant as documents stack up in the bin.

Referring now to FIGS. 13-21 a scanning station work station 400 is illustrated in which the work station comprises a horizontal drop conveyor 410 similar to the drop conveyor 110 discussed above. The work station further includes an image entry assembly 420 substantially similar to the image entry assembly 120 described above. The work station further includes an imaging station 430 and a sorting station substantially similar to the imaging station 210 and sorting station 240 described above.

The work station 400 includes a first vertical support 450 and a second vertical support 460 spaced apart from the first vertical support. The horizontal drop conveyor 410 spans between the two vertical supports 450, 460.

Figure 13:
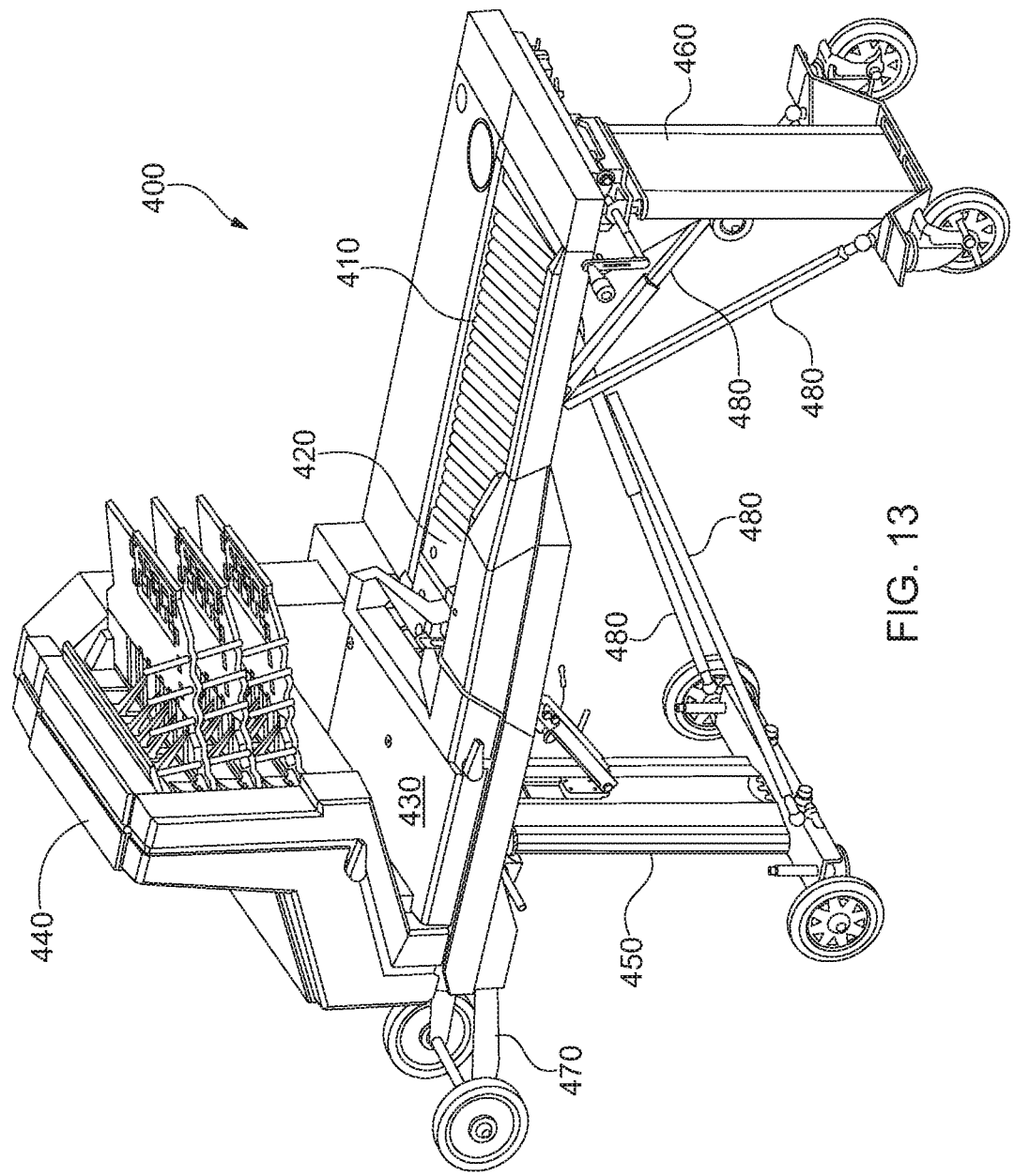
FIG. 13 is a perspective view of an alternative embodiment of an imaging system.
Figure 14:
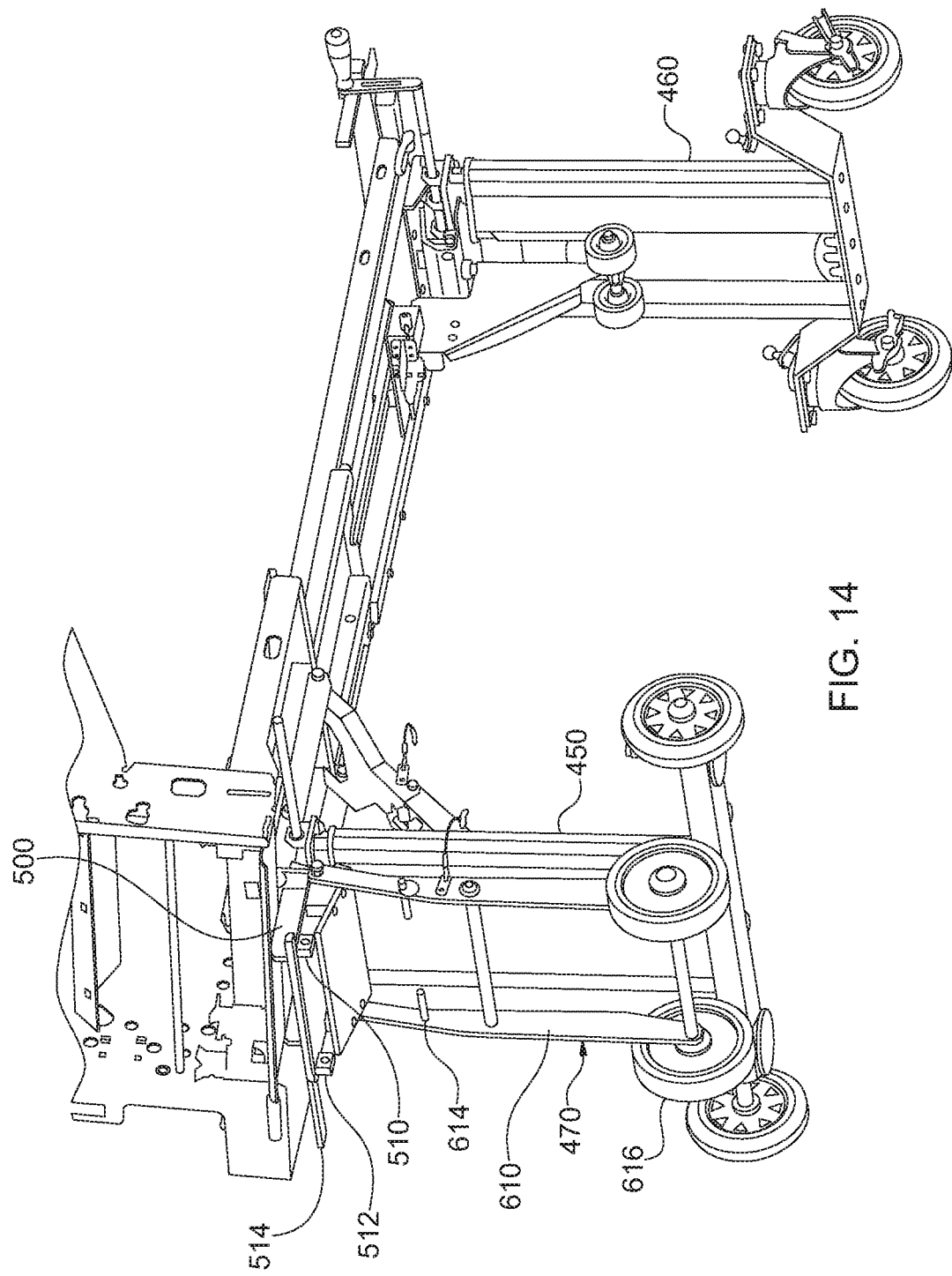
FIG. 14 is a fragmentary perspective view of the support structure of the system illustrated in FIG. 13.

The work station further includes a pivoting outrigger 470 adjacent the first vertical support 450. The outrigger comprises a pair of roller or wheels. In FIG. 14 the outrigger is illustrated in the retracted position. In FIG. 13 the outrigger is pivoted up into the deployed position.

As shown in the drawings, the first and second vertical supports 450, 460 pivot upwardly to collapse the support structure for the work station. A series of latching elements releasably lock the vertical supports in the deployed position in which the work station is shown in FIG. 13. Additionally, the outrigger includes a pair of locking pins that lock the outrigger 470 in the deployed position shown in FIG. 13. In this position, the outrigger supports the front edge of the work station as the work station is stowed away. For instance, the outrigger may engage the floor of a transportation vehicle, such as the bed of a van. The first and second vertical supports can then be unlocked and the vertical support collapse as the work station in stowed.

Referring again to FIG. 14, the device 400 comprises a generally horizontal frame 500 extending across the width of the device. The First and second vertical supports 450, 460 extend downwardly from the horizontal frame 500. Additionally, the outrigger 470 is pivotably connected with the horizontal frame 500.

The outrigger 470 comprises a pivotable frame 610 having a pair of generally parallel spaced apart arms. The upper ends of the arms are rotatably connected with the upper frame 500 of the device. An axle connected to the lower end of the frame 610 spans between the lower ends of the arms. A pair of rollers or wheels 616 are rotatably mounted on the axle.

A locking yoke 510 is rigidly connected with the horizontal frame member 500 for locking the outrigger in the upper position. The locking yoke comprises a pair of spaced apart locking blocks having locking apertures 512. The locking blocks are spaced apart a distance related to the distance between the arms of the outrigger frame. In this way, when the outrigger 470 is pivoted upwardly into a deployed position, the arms of the outrigger frame 610 straddle the mounting blocks of the locking yoke 510. The outrigger frame comprises a pair of locking pins 614 mounted in locking holes. A stop bar 514 fixed to the horizontal frame 500 forms a stop for positioning the outrigger in the deployed position. Specifically, when the outrigger is pivoted upwardly (clockwise from the perspective of FIG. 14.) until the arms of the outrigger frame 610 contact the stop bar 514, the locking holes of the outrigger arms align with the locking holes 512 in the locking yoke 510. Inserting the locking pins 614 into the aligned holes in the outrigger frame 610 and the locking yoke 510 locks the outrigger 470 in the deployed position.

Figure 15:
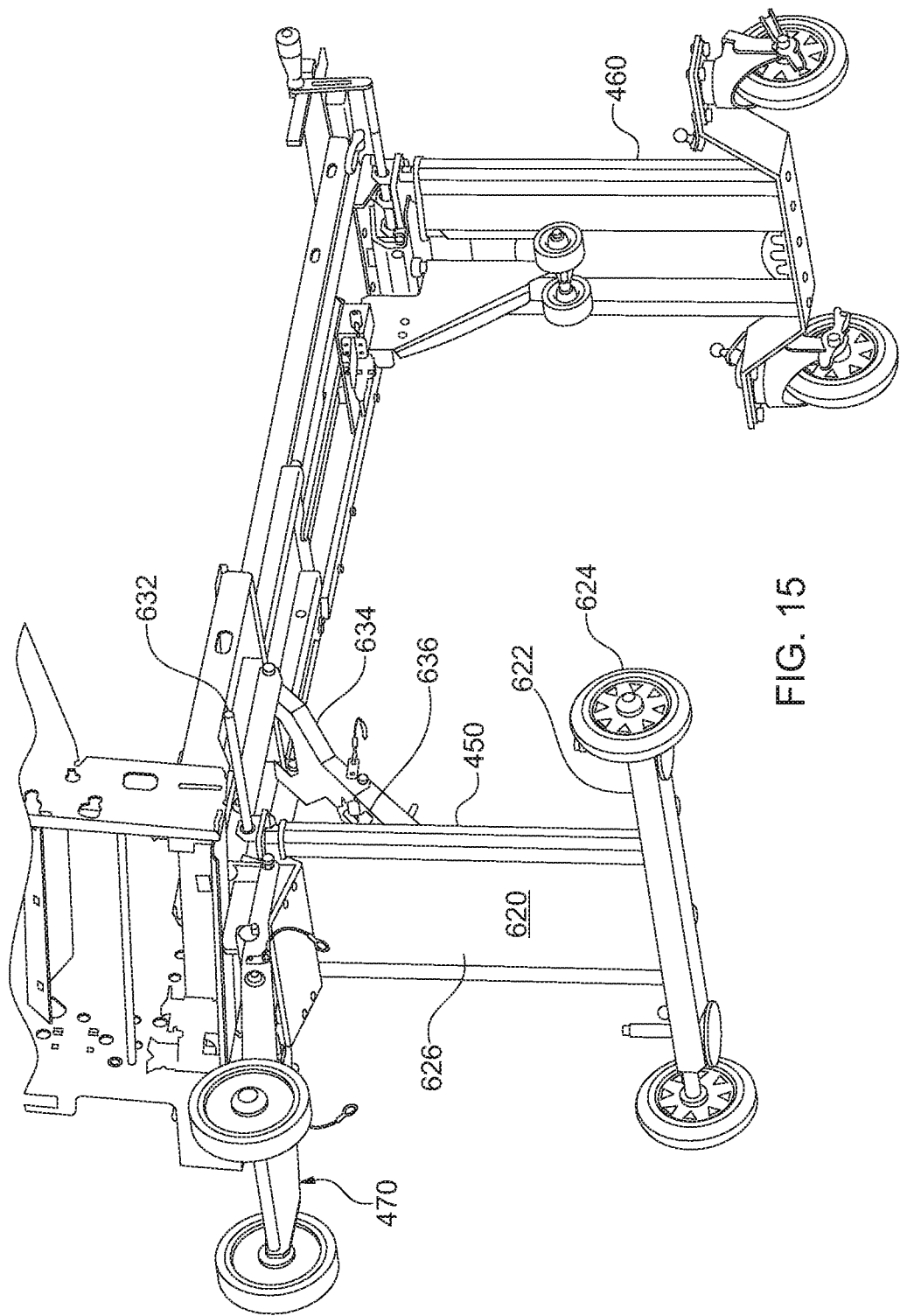
FIG. 15 is a fragmentary perspective view of the support structure illustrated in FIG. 14 showing an support outrigger in a upward position.

As shown in FIG. 15, when locked in the deployed position, the outrigger 470 extends generally horizontally. However, in the present instance, when the outrigger is deployed, the outrigger forms an angle with the horizontal frame 500. More specifically, the wheels 616 of the outrigger 470 extend below the bottom edge of the horizontal frame 500.

Figure 16:
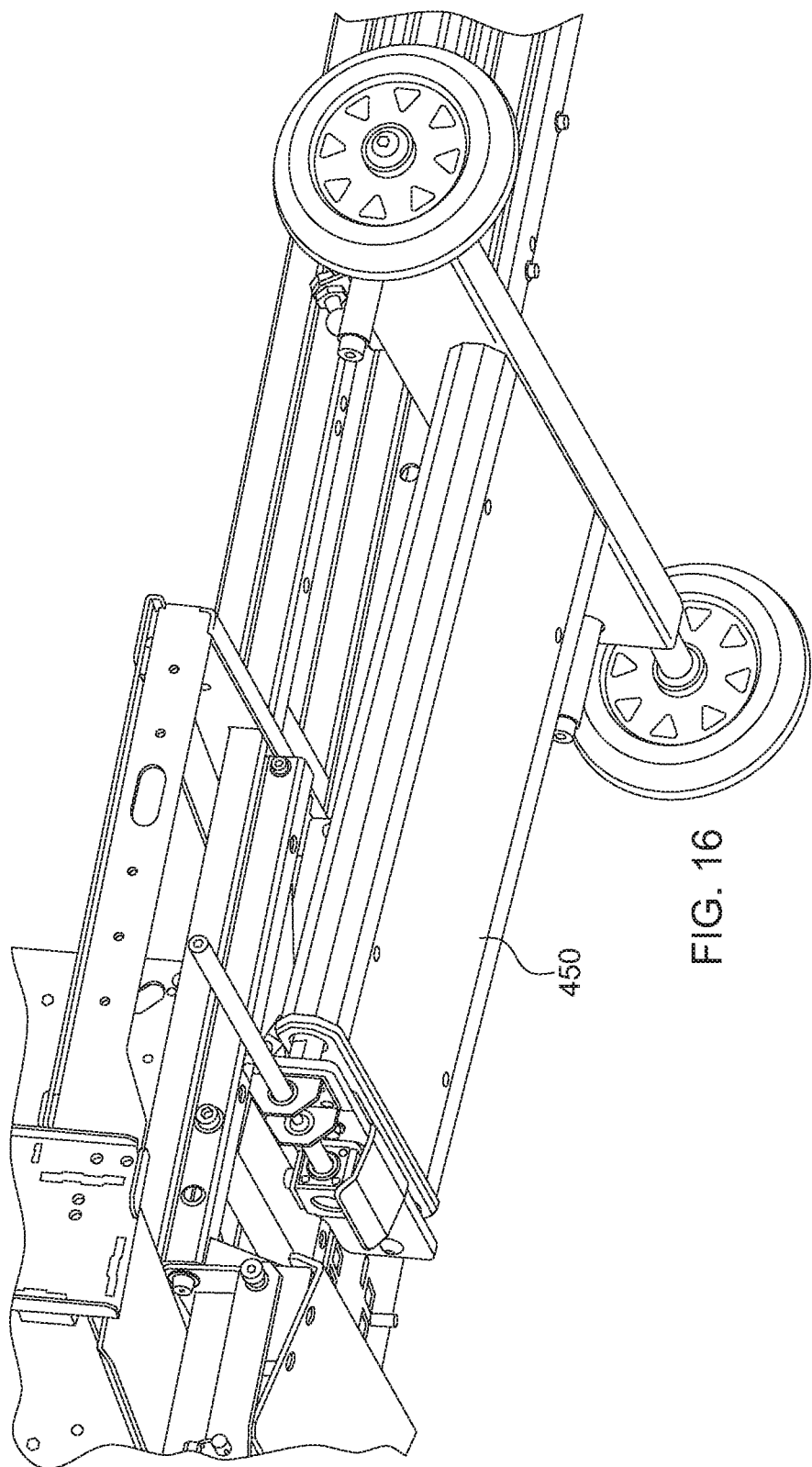
FIG. 16 is an enlarged fragmentary perspective view of the support structure illustrated in FIG. 14.

Referring now to FIGS. 15-16, the details of the first vertical support 450 will be described in greater detail. The first vertical support comprises a first pillar 620 having a pair of inner legs 628 that telescope within outer support 626. In the present instance, coopering gears drive the inner legs 628 relative to the outer support 626 to extend or retract the length of the first pillar 620. The gear box 630 mounted at the top of the first pillar 620 drives the cooperating gears for extending the first pillar. Specifically, a drive axle 632 cooperates with the gear box 630. Rotating the drive axle 632 drives the gears in the gear box 630, thereby actuating the extension and retraction of the first pillar. In this way, the length of the first pillar can be extended or retracted to raise or lower the height of the work station 400.

First vertical support 450 is pivotably connected with the horizontal frame 500 to collapse the device for transportation. As shown in FIGS. 15-16, in the present instance the first vertical support is pivotable between an extended position shown in FIG. 15 and a collapsed position as shown in FIG. 16. The first vertical support 450 pivots counter-clockwise (from the perspective of FIG. 15) to collapse the first vertical support.

The first vertical support 450 may also include an angle bracket 634 to support the first vertical support to impede displacement of the first pillar from the vertical position to the collapsed position. Specifically, the angle bracket 634 impedes pivoting of the pillar 620 in a counter-clockwise direction (from the perspective of FIG. 15). However, the angle bracket 634 is a collapsible to permit displacement of the first vertical support 450. Specifically, the angle bracket 634 comprises two hinged elements that permit the angle bracket to fold, thereby allowing folding of the first vertical support. A locking element impedes folding of the angle bracket. For instance, as shown in FIG. 15, a locking pin 636 may extend across the hinged parts of the angle bracket to impede relative rotation of the hinged parts. Alternatively, a spring-loaded latching element may span the hinged elements to impede folding of the support bracket 634.

As shown in FIG. 16, after the locking element 636 is released, the angle bracket 634 is folded, thereby allowing the first vertical support 450 to pivot the vertical support upwardly into the collapsed position. In the collapsed position, the first vertical support is generally horizontal up against the horizontal frame 500.

In the present instance, a pair of rollers or wheels 624 are mounted on an axle 622 attached to the lower end of the first vertical support 450. In particular, the wheels 624 may have a diameter large enough that in the collapsed position the lower edges of the wheels extend below the side of the first vertical support. In this way, the lower wheels 624 provide rolling elements along the midpoint of the horizontal frame 500.

Figure 17:
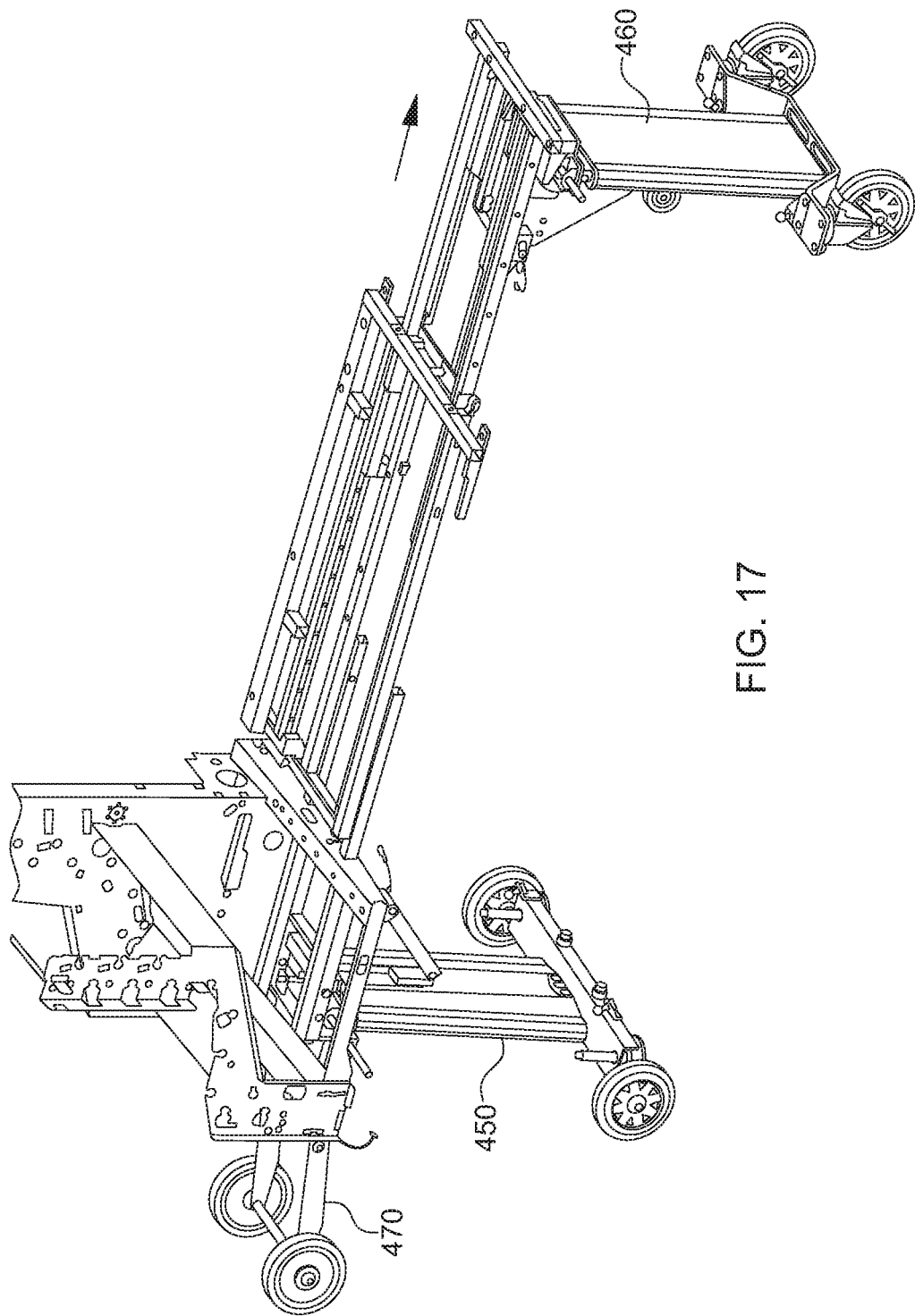
FIG. 17 is an enlarged fragmentary perspective view of the device illustrated in FIG. 13, showing the support structure extended outwardly.

Referring now to FIG. 17, the horizontal frame 500 may include extension slides 520 to expand the width of the horizontal frame. More specifically, the extension slides 520 comprises horizontal rails that extend and retract with cooperating horizontal rails of the horizontal frame 500. In this way, the extension slides can be pulled out horizontal to expand the frame. A work surface, such as a counter surface or other horizontal element can be placed on the extension slides to expand the work surface of the work station 400.

In the present instance, the second vertical pillar 460 is connected to the extension slides 520. The second vertical pillar is configured similarly to the first vertical pillar 450 described above. Specifically, the second vertical pillar 460 comprises a second pillar 640 having an outer support 646 and a pair of telescoping inner legs 648 to extend and retract the length of the second vertical support 460 to raise and lower the height of the upper frame 500. The second vertical support 460 also includes an axle 642 connected to the lower end of the second vertical support 460 and a pair of rollers or wheels 644 rotatably mounted on the axle.

Figure 18:
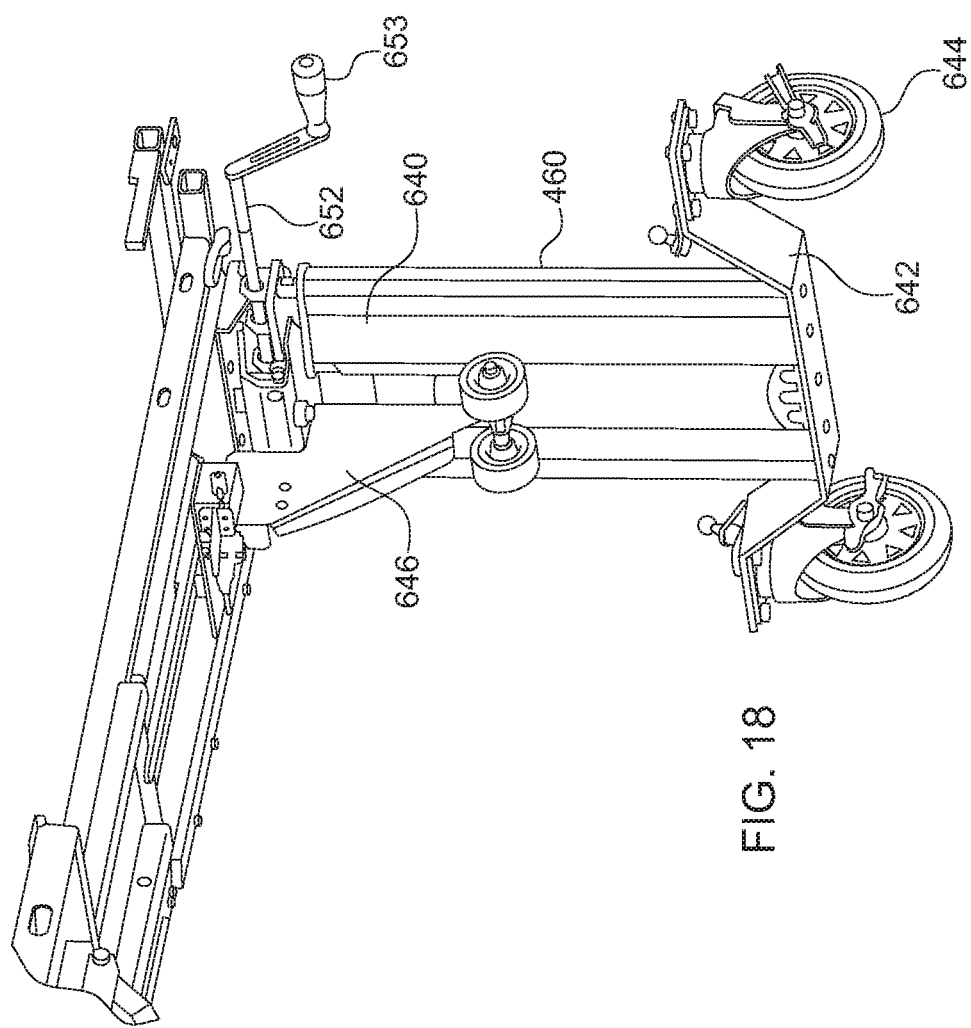
FIG. 18 is an enlarged fragmentary perspective view of a portion of the support structure illustrated in FIG. 14.
Figure 19:
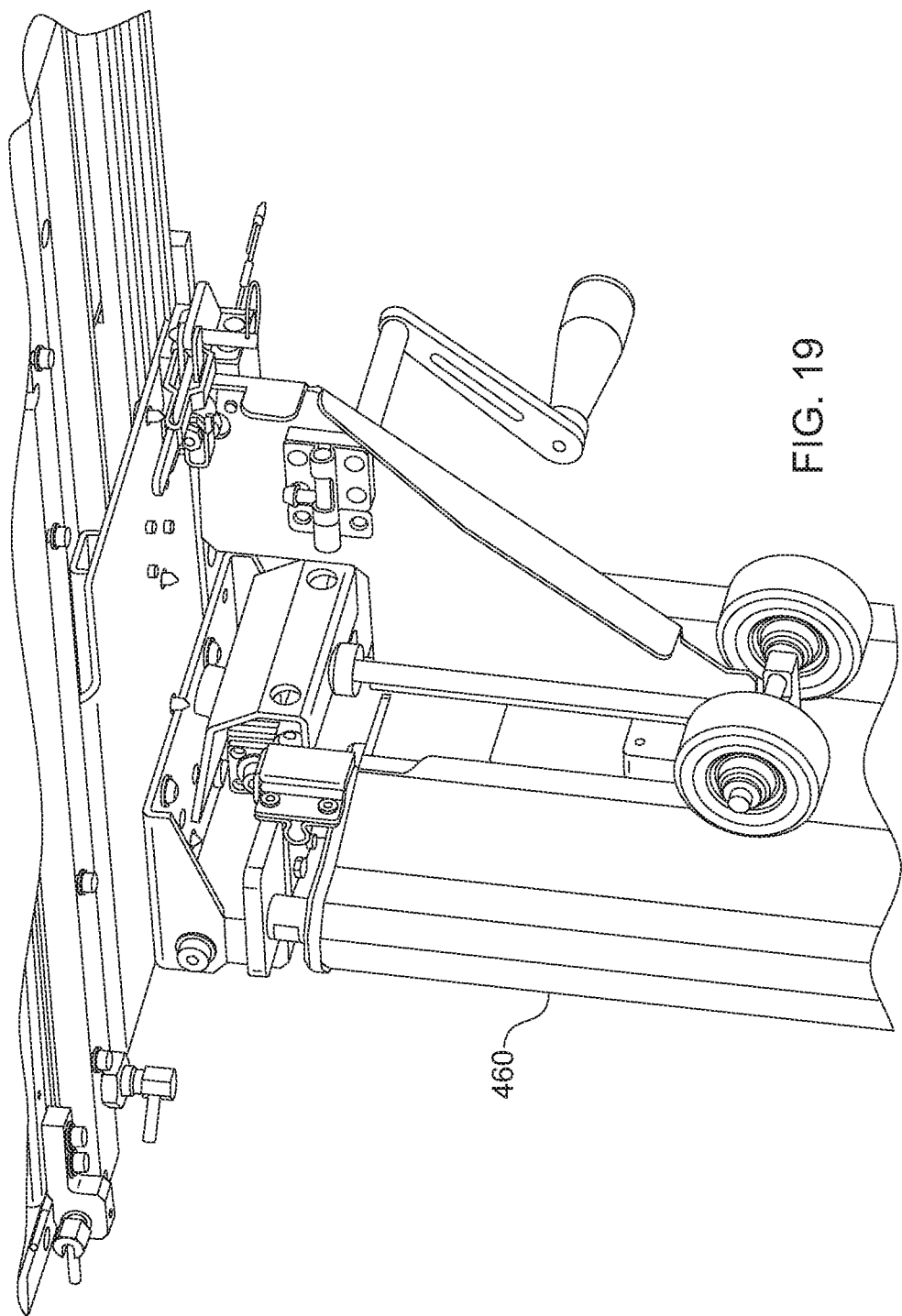
FIG. 19 is an enlarged fragmentary perspective view of a portion of the support structure illustrated in FIG. 18 from a rearward perspective to show the backside of the support structure.
Figure 20:
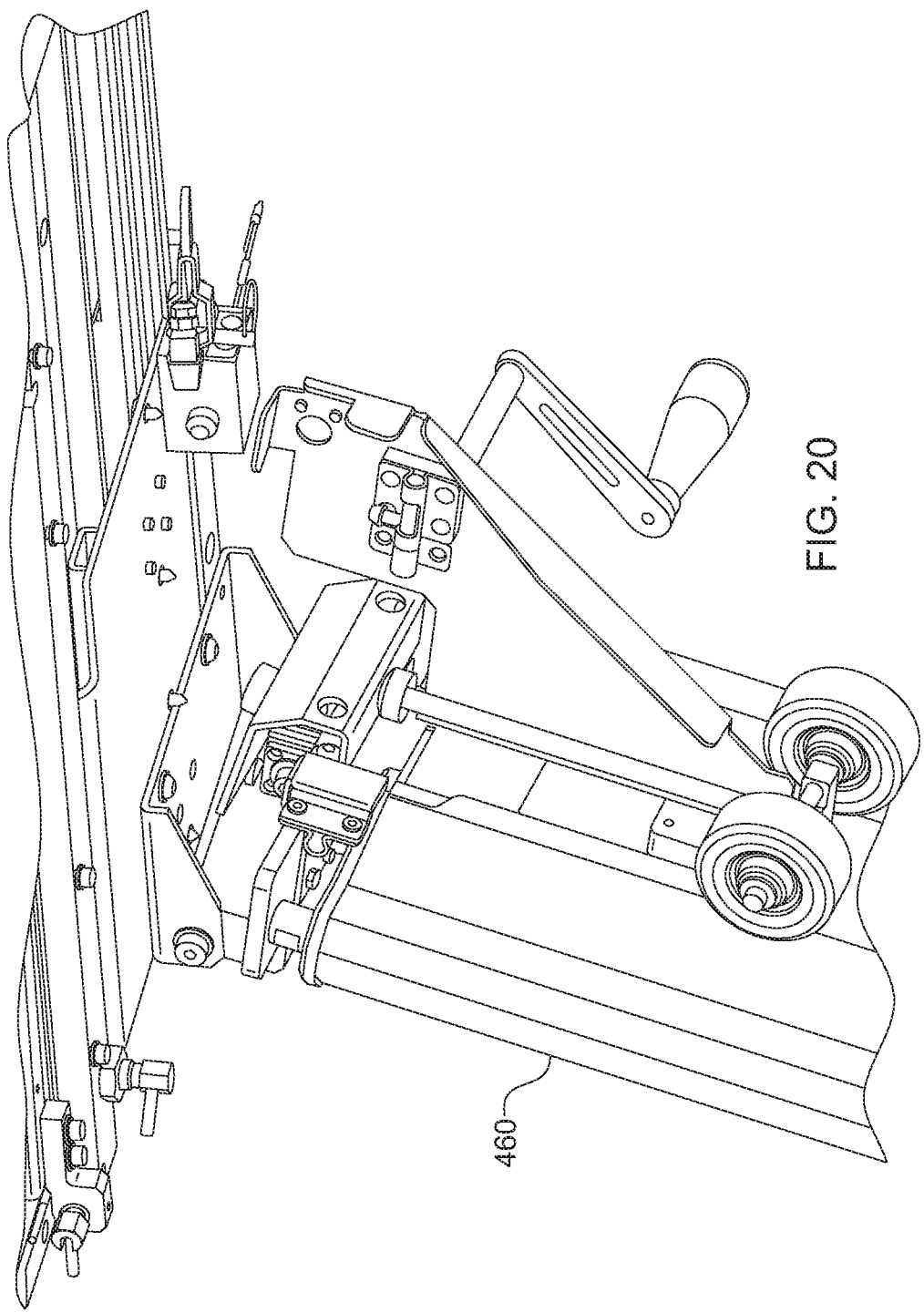
FIG. 20 is an enlarged fragmentary perspective view of the support structure illustrated in FIG. 19.

The second vertical support 460 also includes cooperating gears or other drive elements for extending and retracting the inner legs 648 relative to the outer support 646. A gear box 650 connected to the upper end of the second vertical support 460 is operable to drive the inner legs relative to the outer support, thereby extending or retracting the vertical support. Similar to the first vertical support, the second vertical support includes a drive axle 652 cooperable with the gear box to extend and retract the telescoping legs. As shown in FIG. 18, a crank arm 653 is detachably connected with the drive axle 652 The crank arm 653 is manually operable to rotate the drive axle to raise and lower the height of the work station.

Figure 21:
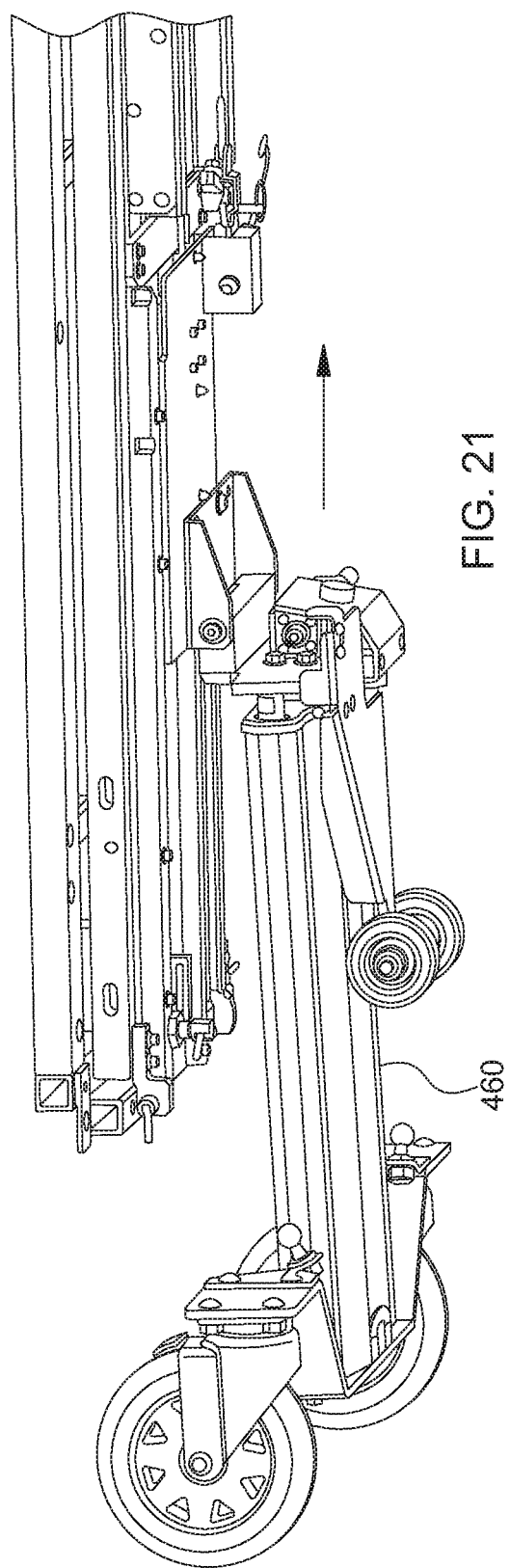
FIG. 21 is an enlarged fragmentary perspective view of the support structure illustrated in FIG. 20.

As shown in FIGS. 18-21, the second vertical support is pivotable between a vertical position and a collapsed position. In the present instance, a locking bracket impedes the vertical support from pivoting into the collapsed position. By releasing the locking bracket, the second vertical support pivots upwardly to collapse the leg. In the present instance, the second vertical support is pivotable in a counter-clockwise direction (from the perspective of FIG. 18) to collapse the second vertical support. After the second vertical leg is collapsed, the wheels on the bottom of the second vertical support project below the horizontal surface of the second vertical support and below the upper frame 500. In this way, the wheels 644 provide a rotatable support at the right end of the work station when the work station is collapsed. Further still, as shown in FIG. 21, after the upper end of the second vertical support is pivotable connected to a support bracket attached to the upper frame. More specifically, the mounting bracket is slideable within a channel in the upper frame 500. In this way, after the second vertical support 460 is collapsed, the second vertical support can be translated along the length of the upper frame 500 to reduce the overall length of the work station in the collapsed configuration.

Configured as described above, the work station can be readily collapsed and stowed into a vehicle or transport element. For instance, the work station can be stowed as follows. The work station can be rolled to the opening in a vehicle having a generally flat bed or floor. The outrigger 470 is pivoted upwardly into a deployed position and locked in the deployed position as shown in FIG. 15. The work station is then partially loaded onto the floor of the vehicle by rolling the outrigger wheels on the floor of the vehicle. The angle bracket 634 is then folded allowing to the first vertical support 450 to be pivoted upwardly. After the first vertical support is released, the workstation can be loaded further into the vehicle by continuing to roll the outrigger wheels further on the vehicle floor. As the work station is further loaded onto the vehicle, the first vertical support contacts the rear end of the vehicle thereby pushing against the first vertical support to pivot the first vertical support upwardly. Once the first vertical support is pivoted into a generally horizontal orientation, the wheels on the bottom of the second vertical support provide rolling support for the work station so that the partially collapsed work station is supported by the outrigger wheels and the wheels of the collapsed first vertical support. The partially collapsed work station can then be rolled further onto the vehicle support at the front end by the outrigger wheels and support at the midpoint by the wheel on the first vertical support. The work station is further loaded onto the vehicle until the second vertical support reaches the vehicle. By releasing the locking bracket for the second vertical support the second vertical support can be pivoted upwardly into the collapsed position. Specifically, after the second vertical support is unlocked the second vertical support can be collapsed by pushing the work station further onto the vehicle so that the edge of the vehicle pushes against the second vertical support pivoting the second vertical support upwardly as the work station is loaded onto the vehicle. If desired, the second vertical leg can then be translated to shorten the overall length of the collapsed device.

It will be recognized by those skilled in the art that changes or modifications may be made to the above-described embodiments without departing from the broad inventive concepts of the invention. It should therefore be understood that this invention is not limited to the particular embodiments described herein, but is intended to include all changes and modifications that are within the scope and spirit of the invention as set forth in the claims.

The invention claimed is:

1. An apparatus for processing documents, comprising:
   a feeder operable to receive a packet of a plurality of documents and separate the documents to serially feed the documents away from the feeder;
   a pre-singulator disposed adjacent the feeder, wherein the pre-singulator comprises a first roller and a second roller forming a first nip for receiving a packet of documents, wherein the first roller is displaceable away from the second roller to form a gap having a height between the first and second rollers;
   a sensor for detecting a characteristic of the transaction indicative of whether the number of documents in the transaction exceeds a predetermined threshold;
   a first biasing element biasing the first roller away from the second roller and a second biasing element biasing the first roller toward the second roller; and
   a controller for independently controlling the operation of the first and second rollers, wherein the controller controls the position of the first roller to control the height of the first gap and wherein the controller controls the first gap by controlling the biasing force of the first biasing element.

2. The apparatus of claim 1 comprising a scanner for scanning the documents to obtain image data for the documents, wherein the feeder feeds the documents to the scanner.

3. The apparatus of claim 2 comprising a generally horizontal conveyor for conveying packets of documents to the pre-singulator.

4. The apparatus of claim 3 wherein the horizontal conveyor is configured to receive packets of documents dropped onto the conveyor and advance the packets toward the pre-singulator.

5. The apparatus of claim 1 wherein the pre-singulator comprises a second pair of rollers comprising a third and fourth roller forming a second nip for receiving the packet of documents, wherein the third roller is displaceable away from the fourth roller to form a gap having a height between the second pair of rollers and wherein the controller is operable to control the position of the third roller to control the second gap independently of the control of the first gap.

6. The apparatus of claim 1 wherein the first roller applies a feed pressure against the packet of documents between the first and second rollers, wherein the feed pressure is substantially constant as the documents are fed from the packet by the feeder.

7. The apparatus of claim 6 wherein the controller controls the feed pressure by controlling the biasing force of the first biasing element.

8. An apparatus for processing documents, comprising:
   a feeder operable to receive a packet of a plurality of documents and separate the documents to serially feed the documents away from the feeder;
   a pre-singulator disposed adjacent the feeder, wherein the pre-singulator comprises a first roller and a second roller forming a first nip for receiving a packet of documents, wherein the first roller is displaceable away from the second roller to form a gap having a height between the first and second rollers;
   a sensor for detecting a characteristic of the transaction indicative of whether the number of documents in the transaction exceeds a predetermined threshold; and
   a controller for independently controlling the operation of the first and second rollers, wherein the controller controls the position of the first roller to control the height of the first gap;
   wherein the first roller applies a feed pressure against the packet of documents between the first and second rollers, wherein the feed pressure is substantially constant as the documents are fed from the packet by the feeder.

9. The apparatus of claim 8 comprising a scanner for scanning the documents to obtain image data for the documents, wherein the feeder feeds the documents to the scanner.

10. The apparatus of claim 9 comprising a generally horizontal conveyor for conveying packets of documents to the pre-singulator.

11. The apparatus of claim 10 wherein the horizontal conveyor is configured to receive packets of documents dropped onto the conveyor and advance the packets toward the pre-singulator.

12. The apparatus of claim 8 wherein the pre-singulator comprises a second pair of rollers comprising a third and fourth roller forming a second nip for receiving the packet of documents, wherein the third roller is displaceable away from the fourth roller to form a gap having a height between the second pair of rollers and wherein the controller is operable to control the position of the third roller to control the second gap independently of the control of the first gap.

13. The apparatus of claim 8 wherein the first roller applies a feed pressure against the packet of documents between the first and second rollers, wherein the feed pressure is substantially constant as the documents are fed from the packet by the feeder.

14. The apparatus of claim 8 wherein the controller controls the feed pressure by controlling the biasing force of the first biasing element.

* * * * *